US010667022B2

(12) United States Patent
Lacroix

(10) Patent No.: US 10,667,022 B2
(45) Date of Patent: May 26, 2020

(54) SECOND SCREEN HAPTICS

(71) Applicant: Immersion Corporation, San Jose, CA (US)

(72) Inventor: Robert Lacroix, Saint-Lambert (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/459,474

(22) Filed: Mar. 15, 2017

(65) Prior Publication Data

US 2017/0188119 A1   Jun. 29, 2017

Related U.S. Application Data

(63) Continuation of application No. 14/791,892, filed on Jul. 6, 2015, now Pat. No. 9,635,440.

(Continued)

(51) Int. Cl.
*H04N 7/00* (2011.01)
*H04N 11/00* (2006.01)
(Continued)

(52) U.S. Cl.
CPC ......... *H04N 21/8133* (2013.01); *G06F 3/016* (2013.01); *G06F 3/14* (2013.01);
(Continued)

(58) Field of Classification Search
CPC ........... H04N 21/8133; H04N 21/4126; H04N 21/8545; H04N 21/435; H04N 21/4122;
(Continued)

(56) References Cited

U.S. PATENT DOCUMENTS 5,816,823 A * 10/1998 Naimark ................. G06F 3/016
434/307 R
6,097,441 A *  8/2000 Allport ............ H04N 21/43632
348/120

(Continued)

FOREIGN PATENT DOCUMENTS

| CN | 102227694 A | 10/2011 |
| JP | 2011-520302 A | 7/2011 |
| WO | 2013/096327 A1 | 6/2013 |

OTHER PUBLICATIONS

Cha, Jonguen et al., "A Framework for Haptic Broadcasting", Multi Media, vol. 16 (3), 2009, 16-27.

(Continued)

*Primary Examiner* — Jefferey F Harold
*Assistant Examiner* — Mustafizur Rahman
(74) *Attorney, Agent, or Firm* — Medler Ferro Woodhouse & Mills PLLC

(57) ABSTRACT

A multi-device system includes at least one media server system, a primary viewing device including a display screen, and a secondary device including a haptic output device. The at least one media server system includes a source of audio-video content and haptic content and is configured to transfer the audio-video content and the haptic content. The haptic content is associated with the audio-video content. The primary viewing device is configured to output the audio-video content received from the at least one media server system. The secondary device is configured to output the haptic content received from the at least one media server system as a haptic effect via the haptic output device.

18 Claims, 19 Drawing Sheets

Related U.S. Application Data

(60) Provisional application No. 62/021,663, filed on Jul. 7, 2014.

(51) Int. Cl.

| | | |
|---|---|---|
| *H04N 21/81* | (2011.01) | |
| *H04N 21/41* | (2011.01) | |
| *H04N 21/8545* | (2011.01) | |
| *H04N 21/435* | (2011.01) | |
| *G06F 3/01* | (2006.01) | |
| *H04N 21/414* | (2011.01) | |
| *H04N 21/43* | (2011.01) | |
| *H04N 21/434* | (2011.01) | |
| *H04N 21/4363* | (2011.01) | |
| *H04N 21/462* | (2011.01) | |
| *G06F 3/14* | (2006.01) | |
| *H04N 21/233* | (2011.01) | |
| *H04N 21/234* | (2011.01) | |
| *H04N 21/845* | (2011.01) | |

(52) U.S. Cl.
CPC ......... *G06F 3/1423* (2013.01); *H04N 21/233* (2013.01); *H04N 21/234* (2013.01); *H04N 21/4122* (2013.01); *H04N 21/4126* (2013.01); *H04N 21/41407* (2013.01); *H04N 21/435* (2013.01); *H04N 21/4307* (2013.01); *H04N 21/4348* (2013.01); *H04N 21/43637* (2013.01); *H04N 21/4622* (2013.01); *H04N 21/845* (2013.01); *H04N 21/8545* (2013.01); *G09G 2354/00* (2013.01); *H04N 21/8186* (2013.01)

(58) Field of Classification Search
CPC ......... H04N 21/41407; H04N 21/4307; H04N 21/4348; H04N 21/43637; H04N 21/4622; H04N 21/8186; H04N 21/233; H04N 21/234; H04N 21/845
USPC ....... 348/552, 553, 578, 586, 500, 521, 533, 348/636, 680, 693, 729, 723, 838, 495, 348/462, 423.1, 333.02, 376, 231.4, 158; 381/58, 61, 62, 326, 334, 370, 379; 725/17, 18, 37, 40, 43, 63, 67, 105

See application file for complete search history.

(56) References Cited

U.S. PATENT DOCUMENTS

| | | |
|---|---|---|
| 6,650,338 B1 | 11/2003 | Kolarov et al. |
| 7,911,328 B2 | 3/2011 | Luden et al. |
| 8,095,646 B2 * | 1/2012 | Capio ................ H04N 7/163 709/203 |
| 8,280,448 B2 | 10/2012 | Bang et al. |
| 8,316,166 B2 * | 11/2012 | Grant ................ G06F 3/016 340/7.6 |
| 8,378,794 B2 | 2/2013 | Alarcon |
| 8,577,203 B2 * | 11/2013 | Choi ................ H04N 21/235 386/239 |
| 8,638,301 B2 | 1/2014 | Birnbaum et al. |
| 8,640,030 B2 * | 1/2014 | Kulas ................ G11B 27/105 715/726 |
| 8,700,791 B2 * | 4/2014 | Lacroix ................ G06F 3/016 709/231 |
| 8,842,969 B2 * | 9/2014 | Wikander ................ H04N 9/8205 386/248 |
| 8,892,233 B1 | 11/2014 | Lin et al. |
| 8,976,112 B2 | 3/2015 | Birnbaum et al. |
| 8,977,376 B1 | 3/2015 | Lin et al. |
| 9,049,494 B2 * | 6/2015 | Dhruv ................ H04N 21/6543 |
| 9,400,555 B2 * | 7/2016 | Quigley ................ A61H 19/00 |
| 9,613,506 B2 * | 4/2017 | Moussette ........... H04N 21/4307 |
| 9,635,440 B2 * | 4/2017 | Lacroix ................ H04N 21/4122 |
| 10,013,857 B2 * | 7/2018 | Sridhara ............ H04N 21/235 |
| 10,135,887 B1 * | 11/2018 | Esser ................. H04L 65/4015 |
| 2001/0023436 A1 | 9/2001 | Srinivasan et al. |
| 2002/0194620 A1 * | 12/2002 | Zdepski ................ H04N 7/165 725/138 |
| 2003/0070183 A1 * | 4/2003 | Pierre .................... H04N 7/088 725/135 |
| 2003/0128859 A1 * | 7/2003 | Greene ................. H04R 25/70 381/351 |
| 2003/0135860 A1 * | 7/2003 | Dureau ............ H04N 21/43615 725/82 |
| 2004/0031058 A1 * | 2/2004 | Reisman ............... G06F 16/954 725/112 |
| 2006/0095516 A1 | 5/2006 | Wijeratne |
| 2006/0171553 A1 | 8/2006 | Wong et al. |
| 2007/0038164 A1 | 2/2007 | Afshar |
| 2007/0083895 A1 * | 4/2007 | McCarthy .......... H04N 5/44543 725/46 |
| 2007/0236449 A1 | 10/2007 | Lacroix et al. |
| 2008/0112581 A1 | 5/2008 | Kim et al. |
| 2008/0198139 A1 | 8/2008 | Lacroix et al. |
| 2008/0223627 A1 * | 9/2008 | Lacroix ................ G06F 3/016 178/18.01 |
| 2009/0049092 A1 * | 2/2009 | Capio ................... H04N 7/163 |
| 2009/0085878 A1 | 4/2009 | Huebel et al. |
| 2009/0096632 A1 * | 4/2009 | Ullrich ................ H04N 9/8205 340/4.21 |
| 2009/0128306 A1 * | 5/2009 | Luden .................... G06F 3/016 340/407.1 |
| 2009/0175594 A1 | 7/2009 | Ann et al. |
| 2009/0222520 A1 * | 9/2009 | Sloo ................. H04N 7/17318 709/205 |
| 2009/0327894 A1 * | 12/2009 | Rakib .................... G11B 27/34 715/719 |
| 2010/0122286 A1 * | 5/2010 | Begeja ................. G06Q 30/02 725/34 |
| 2010/0132003 A1 * | 5/2010 | Bennett ............ H04N 21/43615 725/127 |
| 2010/0195623 A1 | 8/2010 | Narasimhan et al. |
| 2010/0214243 A1 | 8/2010 | Birnbaum et al. |
| 2010/0275235 A1 * | 10/2010 | Joo ....................... H04N 5/262 725/74 |
| 2011/0133910 A1 * | 6/2011 | Alarcon ................ A61H 19/32 340/407.1 |
| 2011/0188832 A1 * | 8/2011 | Choi .................. H04N 21/235 386/239 |
| 2011/0243524 A1 * | 10/2011 | Cho .................... H04N 9/8205 386/230 |
| 2011/0320627 A1 | 12/2011 | Landow et al. |
| 2012/0033937 A1 * | 2/2012 | Kim ..................... G11B 27/034 386/230 |
| 2012/0221148 A1 * | 8/2012 | Menard ................... A47C 1/12 700/275 |
| 2012/0272149 A1 | 10/2012 | Lee et al. |
| 2012/0281138 A1 * | 11/2012 | Choi .................. H04N 21/235 348/460 |
| 2012/0306631 A1 * | 12/2012 | Hughes ................ G09B 21/009 340/407.1 |
| 2013/0038792 A1 * | 2/2013 | Quigley ................ A61H 19/00 348/515 |
| 2013/0105567 A1 | 5/2013 | Choi |
| 2013/0106691 A1 | 5/2013 | Rank |
| 2013/0129303 A1 | 5/2013 | Lee et al. |
| 2013/0198625 A1 * | 8/2013 | Anderson ............. G06F 3/016 715/701 |
| 2013/0227410 A1 * | 8/2013 | Sridhara ............. H04N 21/235 715/702 |
| 2013/0311881 A1 | 11/2013 | Birnbaum et al. |
| 2013/0347018 A1 * | 12/2013 | Limp ................. H04N 21/4826 725/19 |
| 2014/0063259 A1 | 3/2014 | Rhodus et al. |
| 2014/0071342 A1 * | 3/2014 | Winograd ................ H04N 5/44 348/383 |
| 2014/0089815 A1 * | 3/2014 | Gildfind ........... H04N 21/42203 715/753 |
| 2014/0176415 A1 | 6/2014 | Buuck et al. |

(56) References Cited

U.S. PATENT DOCUMENTS

| | | | | |
|---|---|---|---|---|
| 2014/0181853 | A1* | 6/2014 | Dureau | H04N 5/50 725/19 |
| 2014/0198069 | A1* | 7/2014 | Park | G06F 3/016 345/173 |
| 2014/0205260 | A1 | 7/2014 | Lacroix | |
| 2014/0236737 | A1 | 8/2014 | Rowe | |
| 2014/0267904 | A1 | 9/2014 | Saboune | |
| 2014/0267911 | A1* | 9/2014 | Grant | H04N 21/42222 348/563 |
| 2014/0270681 | A1 | 9/2014 | Sen et al. | |
| 2014/0340209 | A1 | 11/2014 | Lacroix | |
| 2014/0347177 | A1* | 11/2014 | Phan | H04N 21/234336 340/407.1 |
| 2014/0371889 | A1* | 12/2014 | Donaldson | G06F 3/165 700/94 |
| 2015/0020121 | A1* | 1/2015 | Paugh | H04L 12/2812 725/78 |
| 2015/0033277 | A1* | 1/2015 | Li | H04N 21/4307 725/116 |
| 2015/0054727 | A1* | 2/2015 | Saboune | G06F 3/016 345/156 |
| 2015/0057493 | A1* | 2/2015 | Harris, Jr. | G06F 16/43 600/38 |
| 2015/0113563 | A1* | 4/2015 | Woods | H04N 5/765 725/34 |
| 2015/0154966 | A1* | 6/2015 | Bharitkar | G10L 19/008 381/23 |
| 2015/0189223 | A1* | 7/2015 | Levesque | H04N 5/9305 386/227 |
| 2015/0199015 | A1* | 7/2015 | Ullrich | H04N 9/8205 345/156 |
| 2015/0245186 | A1* | 8/2015 | Park | H04W 4/80 455/417 |
| 2015/0268726 | A1 | 9/2015 | Saboune et al. | |
| 2016/0007095 | A1* | 1/2016 | Lacroix | H04N 21/4122 348/552 |
| 2016/0180879 | A1* | 6/2016 | Ullrich | G11B 27/10 386/201 |
| 2016/0246376 | A1* | 8/2016 | Birnbaum | G06F 3/016 |
| 2016/0366450 | A1* | 12/2016 | Hamam | H04L 67/2823 |
| 2017/0339463 | A1* | 11/2017 | Pike | H04N 21/4725 |
| 2017/0358181 | A1* | 12/2017 | Moussette | H04M 1/72569 |

OTHER PUBLICATIONS

Danieau, Fabien et al., "Enhancing audiovisual experience with haptic feedback: a survey on HAV", IEEE Transactions on Haptics 6, 2 (2013), 2013, 193-205.

Kim, Jaeha et al., "Construction of a haptic-enabled braodcasting system based on the MPEG-V standard", SignalProcessing—ImageCommunication(2012),http://dx.doi.org/10.1016/j.image.2012.10.01 0.

Mizushina, Yusuke et al., "Haptic Broadcasting—System of Transmitting the Experience in Badminton", Graduate School of Media Design, Keio University; Springer-Verlag Berlin Heidelberg 2011.

O'Modhrain, Sile et al., "Adding Interactivity: Active Touch in Broadcast Media", Proceedings of the International Symposium on Haptic Interfaces for Virtual Environment and Teleoperator Systems (Haptics '04), 2004, 293-294.

Rogers, Emily F., "Is the TV the Second Screen Now?", www.hapticgeneration.com.au, Dec. 9, 2013.

International Search Report & Written Opinion, PCT/US2015/039233, dated Oct. 1, 2015.

Extended European Search Report dated Jan. 2, 2018 in corresponding European Patent Applicatioin No. 15818887.0.

Office Action dated Jan. 25, 2018 in co-pending U.S. Appl. No. 14/738,707.

Non-Final Office Action issued in U.S. Appl. No. 14/738,707, dated Aug. 11, 2017.

Extended European Search Report issued in EP Appl. No. 16173327, dated Oct. 17, 2016.

Office Action issued in co-pending U.S. Appl. No. 14/738,707, dated Jun. 1, 2018.

Communication pursuant to Article 94(3) EPC issued in European Application No. 15818887.0, dated Nov. 16, 2018.

First Office Action issued in Chinese Application No. 201580036974.8, dated Apr. 25, 2019.

Non-Final Office Action issued in U.S. Appl. No. 14/738,707, dated Jan. 4, 2019.

Notice of Reasons for Refusal issued in Japanese Application No. 2017-500807, dated Jul. 23, 2019.

Communication pursuant to Article 94(3) EPC issued in European Application No. 15818887.0 dated Sep. 23, 2019.

* cited by examiner

US 10,667,022 B2

SECOND SCREEN HAPTICS

CROSS-REFERENCE TO RELATED APPLICATIONS

This application is a continuation of U.S. patent application Ser. No. 14/791,892 filed Jul. 6, 2015, which claims the benefit of U.S. Provisional Patent Application Ser. No. 62/021,663, filed Jul. 7, 2014, both of which are hereby incorporated by reference in their entirety for all purposes.

FIELD OF THE INVENTION

Embodiments hereof relate generally to multimedia content processing and presentation, and in particular, to enhancing audio-video content with haptic effects.

BACKGROUND OF THE INVENTION

The term "second screen" refers to the use of a computing device to provide an enhanced viewing experience for content that is being viewed on a first or primary device or screen, such as a television. Stated another way, a second screen is a second electronic device used by television viewers to enhance a program they're watching. A second screen is often a smartphone or tablet computer, where a special complementary app may allow the viewer to interact with a television program in a different way such that the tablet or smartphone becomes a TV companion device. For example, some of these secondary displays enable real-time chat about visual broadcasts, such as news or current event broadcasts. The second screen phenomenon represents an attempt to make TV more interactive for viewers.

Haptic effects, commonly used in the video gaming industry, can provide tactile cues that enhance a user experience and make a virtual environment more interactive for users. For example, vibration effects, or vibrotactile haptic effects, may be useful in providing cues to users of electronic devices to alert the user to specific events, or provide realistic feedback to create greater sensory immersion within a simulated or virtual environment.

Haptic effects, however, are not typically broadcast or otherwise provided to a primary viewing device such as a television. Accordingly, embodiments hereof are related to the use of a second screen to further enhance a viewing experience for a user. More particularly, embodiments hereof are related to enhancing audio-video content with haptic effects in a multi-device environment.

BRIEF SUMMARY OF THE INVENTION

Embodiments hereof relate to a multi-device system, the system including at least one media server system, a primary viewing device including a display screen, and a secondary device including a haptic output device. The at least one media server system includes a source of audio-video content and haptic content and is configured to transfer the audio-video content and the haptic content. The haptic content is associated with the audio-video content. The primary viewing device is configured to output the audio-video content received from the at least one media server system. The secondary device is configured to receive user input and is configured to output the haptic content received from the at least one media server system as a haptic effect via the haptic output device.

Embodiments hereof also relate to a multi-device system, the system including at least one media server system, a primary viewing device including a display screen and being configured to output audio-video content, and a secondary device configured to receive user input and including a haptic output device configured to output a haptic effect to a user. The at least one media server system includes a source of audio-video content and haptic content and is configured to transfer the audio-video content and the haptic content. The haptic content is associated with the audio-video content. The at least one media server system is configured to transfer the audio-video content and the haptic content to at least one of the primary viewing device and the secondary device. The primary viewing device is configured to output the audio-video content received from the at least one media server system and the secondary device is configured to output the haptic content received from the at least one media server system, the haptic content being output as a haptic effect via the haptic output device.

Embodiments hereof also relate to a method of conveying a haptic effect to a viewer of audio-video content. Audio-video content is received at a primary viewing device, the primary viewing device including a display screen. Haptic content is received at a secondary device, the secondary device configured to receive user input and including a haptic output device configured to output a haptic effect to a user. The haptic content is associated with the audio-video content. The audio-video content is output or rendered on the primary viewing device, and the haptic content is output or rendered on the secondary device. The haptic content is output as a haptic effect via the haptic output device.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to a multi-device system for conveying haptic content to a viewer of audio-video content. More particularly, audio-video content and haptic content that is associated with the audio-video content are stored or originate from at least one media server system. Audio-video content includes but is not limited to television shows, movies, sports broadcasts, news broadcasts, user-generated content, or other programming that include both video and audio components thereto. As used herein, haptic content that is "associated" with audio-video content includes but is not limited to any haptic or tactile effects that are correlated, connected, linked, or other related to the audio-video content in order to accompany, enhance, supplement, or complement the substance of the audio-video content. The audio-video content is rendered or output on a primary viewing device, such as a TV, and haptic content is rendered or output on a secondary device, such as a smartphone or tablet computer. For example, a user watches a video on the primary viewing device, i.e., a TV, holds the secondary device, i.e., a smartphone or tablet computer, or has attached or coupled to his body the secondary device, i.e., a wearable device such as but not limited to a wrist-watch coupled to a user's wrist, an arm-band coupled to a user's arm or a wearable device coupled to another body part. While watching the video on the primary viewing device, the secondary device is configured to convey tactile or haptic effects to the user. The haptic effects are related to or associated with the video being watched on the primary viewing device and thus the system results in a haptically-enhanced media experience for the user in a multi-device environment.

Figure 1:
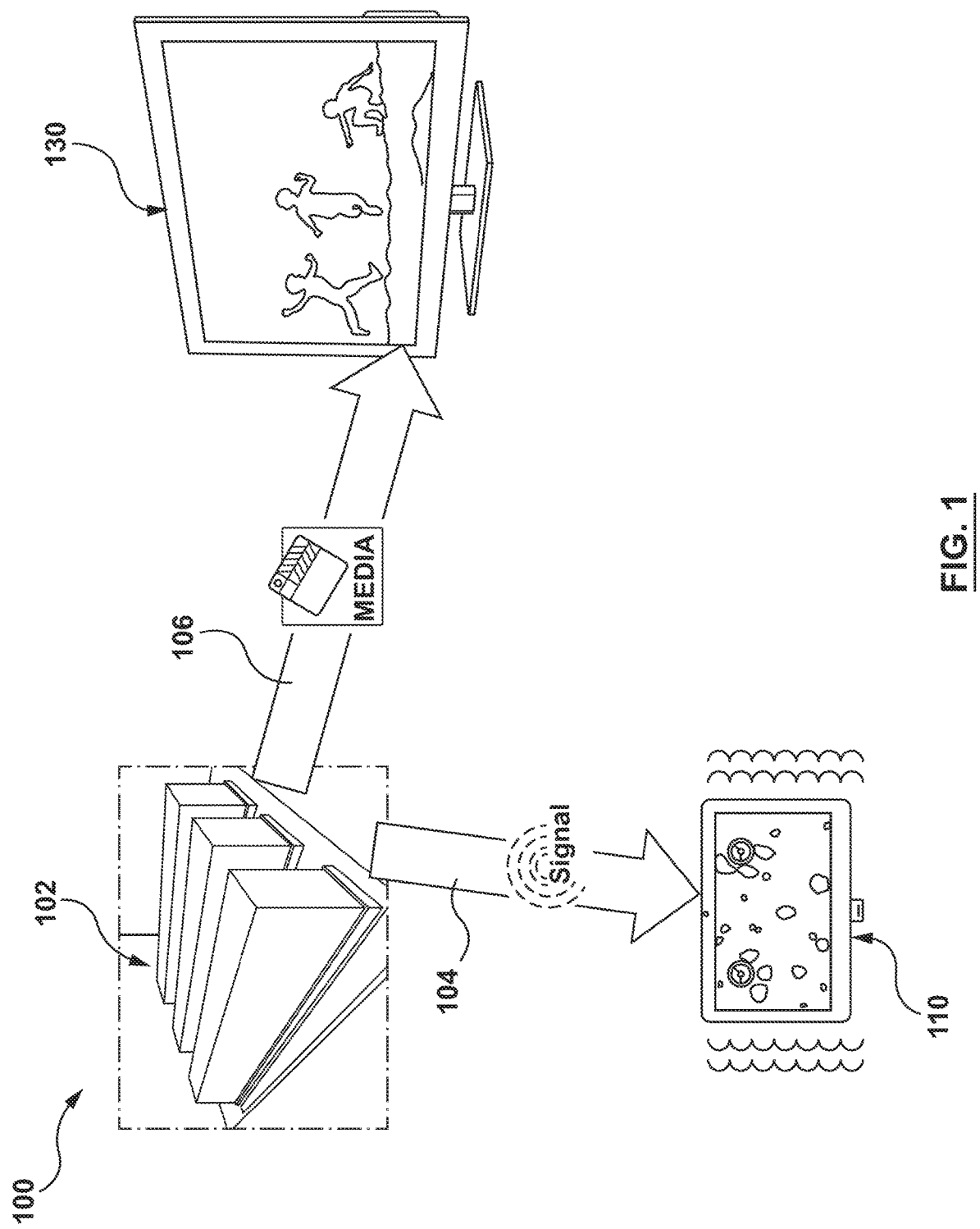
FIG. 1 is an illustration of a multi-device system including a media server, a primary viewing device, and a secondary device, wherein the media server delivers audio-video content to the primary viewing device and haptic content to the secondary device.
Figure 2:
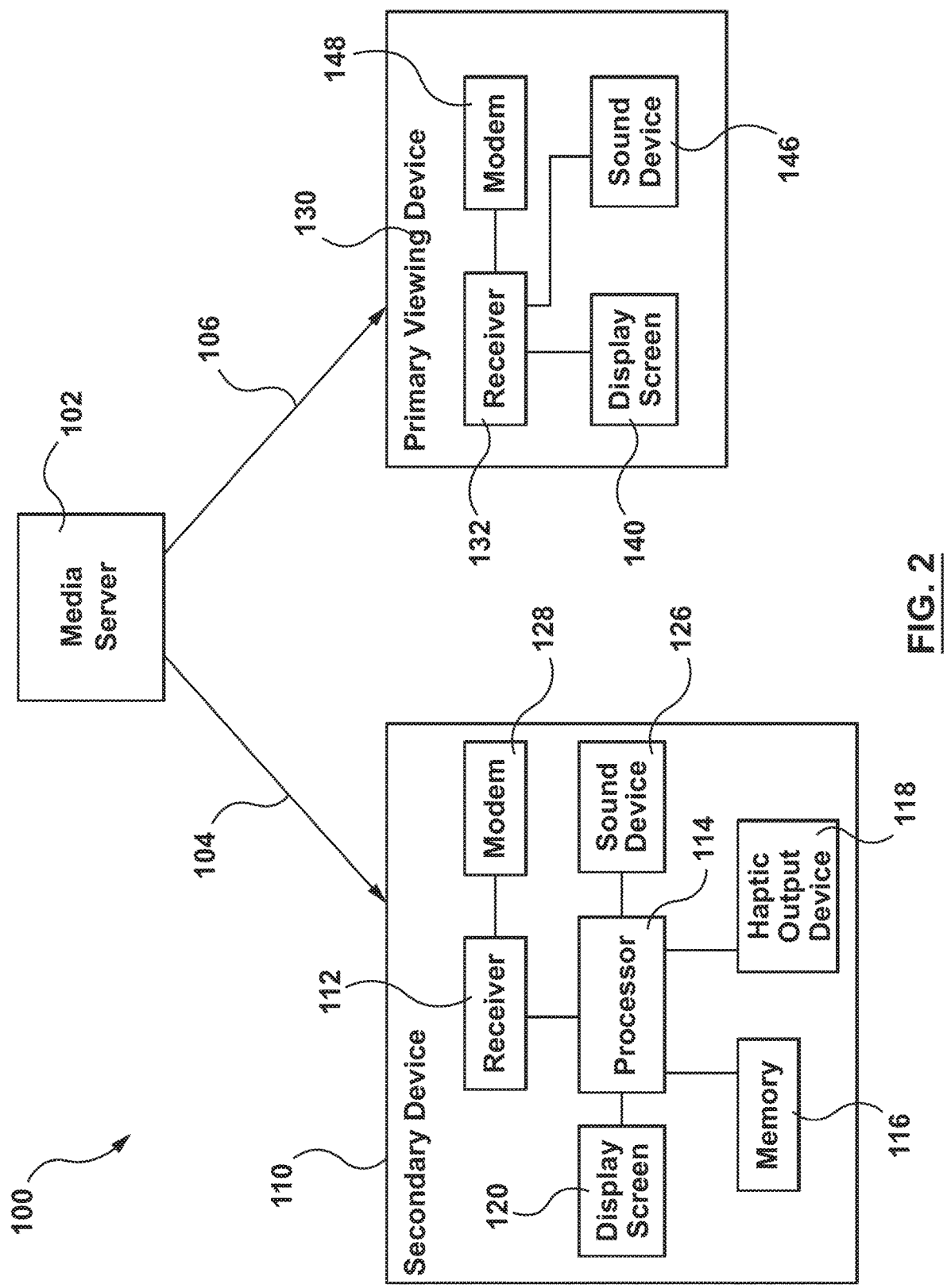
FIG. 2 is a block diagram of the system of FIG. 1.

More particularly, with reference to FIGS. 1 and 2, a multi-device system 100 according to an embodiment hereof is shown. FIG. 1 is a schematic illustration of system 100, while FIG. 2 is a block diagram thereof. System 100 includes a media server 102, a primary viewing device 130, and a secondary device 110. Media server 102 is a source of audio-video content or data and associated haptic content or data. Media server 102 communicates with primary viewing device 130 in order to transmit or send the audio-video content to the primary viewing device. The audio-video content is transmitted from media server 102 as an audio-video signal 106. Audio-video signal 106 may be a broadcast standard signal, e.g. over the air or cable, or may be an Over the Top Technology (OTT) unicast type signal, e.g. Netflix to SmartTV. Media server 102 also communicates with secondary device 110 in order to transmit or send the haptic content to the secondary device. The haptic content is transmitted from media server 102 as a haptic signal 104.

Media server 102 may be, for example, a broadcast network service, a cable communication service, a satellite communication service, a cloud video streaming service, a gaming console, or any other type of server. Media server 102 communicates with primary viewing device 130 and secondary device 110 using wired or wireless communication means known to those of skill in the art. In addition, although shown in a remotely-located device such that signals therefrom are communicated through a wired or wireless connection, media server 102 may alternatively be located within or stored on secondary device 110 or primary viewing device 130.

Primary viewing device 130 is an audio-video display device such as a television or TV that is configured to output the audio-video content received from media server 102. As shown on the block diagram of FIG. 2, primary viewing device 130 includes a receiver 132, a sound device 146, and a display screen 140. Receiver 132 receives audio-video signal 106 and turns audio-video signal 106 into electrical signals that can be processed into an image and sound. Sound device 146 may be for example speakers that are built into or coupled to primary viewing device 130 and turn electrical signals into sound waves to play audio along with the video images. Primary viewing device 130 thus outputs audio via sound device 146. Display screen 140 is configured to turn electrical signals into visible light and may be any type of medium that outputs video to a user; this includes but is not limited to monitors, television screens, plasmas, LCDs, projectors, or any other display devices. Primary viewing device 130 thus outputs video via display screen 140. Audio-video display devices other than a TV may be used as primary viewing device 130 including but not limited to smart phones, game consoles, personal digital organizers, notebook computers and other types of computers having a display screen coupled thereto. Depending upon the type of media server 102 utilized, primary viewing device 130 may include a built-in wired or wireless modem 148 for receiving streaming signals from the Internet. Alternatively, modem 148 may be coupled to primary viewing device 130 rather than built-in.

Secondary device 110 is configured to output the haptic content received from media server 102 as a haptic effect that is felt or perceived by a user. In order to perceive haptic effects, secondary device 110 is a device that is held by a user, attached or coupled to a user, or otherwise has a surface that can convey haptic or tactile effects to a user. In an embodiment, secondary device is also configured to or capable of receiving user input or control via a user input element such as a touch screen, a touchpad, a computer peripheral, a control button, a trigger, a joystick or thumb stick, or the like. For example, in an embodiment, secondary device 110 is a mobile phone or tablet computer that includes haptic effect rendering capability. For example, secondary device 110 may be a tablet computer well known and available in the market, such as an Apple® Ipad®, Kindle® Fire®, and Samsung® Galaxy Tab®. Other suitable devices for secondary device 110 include but not limited to, personal digital assistants (PDA), computers, gaming peripherals, and other devices known to those skilled in the art that are configured to output the haptic content and also configured to or capable of receiving user input.

As shown on the block diagram of FIG. 2, secondary device 110 includes a receiver 112, a processor 114, a memory 116, at least one haptic output device 118, a display screen 120, and a sound device 126. Secondary device 110 executes a software application that is stored in memory 116 and executed by processor 114. Processor 114 may be any type of general purpose processor, or could be a processor specifically designed to provide haptic effect signals. Memory 116 may be any type of storage device or computer-readable medium, such as but not limited to random access memory (RAM) or read-only memory (ROM). Memory 116 may also be located internal to the processor, or any combination of internal and external memory. Sound device 126 may be for example speakers that are built into or coupled to secondary device 110 such that secondary device 110 has the ability to output audio via sound device 126. In this embodiment, secondary device 110 also has the ability to output video via display screen 120. Display 120 may be coupled to secondary device 110 or as known to those skilled in the art, secondary device 110 and display 120 may be combined into a single device. In an embodiment, display screen 120 is a touch screen configured to receive user input. In addition, depending upon the type of media server 102 utilized, secondary device 110 may include a built-in wired or wireless modem 128 for receiving streaming signals from the Internet. Alternatively, modem 128 may be coupled to secondary device 110 rather than built-in.

In operation, receiver 112 of secondary device 110 receives haptic signal 104 and recognizes the haptic signal 104. Haptic signal 104 is then routed or transmitted to processor 114. Haptic signal 104 may, for example, include a direct haptic effect stream or set of commands indicating which haptic effects must be performed. In response to receiving haptic signal 104 from media server 102, processor 114 instructs haptic output device 118 to provide or output one or more haptic effects to a user. Processor 114 can decide what haptic effects to send to haptic output device 118 and in what order to send the haptic effects. For example, haptic signal 104 may include voltage magnitudes and durations that are streamed from media server 102 to secondary device 110. In another example, haptic signal 104 may provide high level commands to processor 114 such as the type of haptic effect to be output (e.g. vibration, jolt, detent, pop, etc.) by haptic output device 118, whereby the processor 114 instructs haptic output device 118 as to particular characteristics of the haptic effect which is to be output (e.g. magnitude, frequency, duration, etc.). Processor 114 may retrieve the type, magnitude, frequency, duration, or other characteristics of the haptic effect from memory 116 coupled thereto.

Haptic feedback enhances the user experience. As used herein, kinesthetic effects (such as active and resistive haptic feedback) and/or tactile effects (such as vibration, texture, and heat) are known collectively as "haptic feedback" or "haptic effects." The collective haptic effects provide the user with a greater sense of immersion to the audio-video content as multiple modalities are being simultaneously engaged, e.g., video, audio, and haptics. For example, vibration effects, or vibrotactile haptic effects, may be useful in providing cues to users to alert the user to specific events, or provide realistic feedback to create greater sensory immersion within a simulated or virtual environment. Examples of haptic effects that advantageously may output by secondary device 110 while a user is viewing audio-video content via primary device 130 include but are not limited to (1) a mixing booth at a live sports event, where several accelerometers, gyroscopes, and other sensors are taking measurements of the dynamic properties of objects of interest (e.g., a basketball) and they are being transformed through algorithms into meaningful haptic effect data; (2) audio and video analysis equipment and algorithms, observing the audio-video content and determining when it is appropriate to generate haptic effect data, for example, creating a haptic effect representing the feeling of a bodycheck when two hockey players are seen to collide on-screen; (3) handcrafted haptic effects generated by an artist using tools that facilitate haptic effect data creation, for example, haptic sensations are designed by an artist for a Hollywood action movie where a series of gargantuan explosions interspersed with machine gun fire; and (4) non-contact measurement equipment, directed at objects of interest, measuring the dynamic properties of the objects, and feeding the measurement data to algorithms that will transform the measurement data into meaningful haptic effect data, for example, a laser vibrometer pointed to a gong that is being struck by a mallet, the vibrometer picking up the gong motions and oscillations created by the strike, and feeding the vibrometer data to equipment running algorithms that transform the vibrometer data into haptic sensations. Processor 114 of secondary device 110 may be running software algorithms that further tailor or tune the haptic content to optimize for the specific type of secondary device that is rendering the haptic content.

Haptic effects provided by haptic output device 118 may include but are not limited to transient effects such as detents or vibrations. Haptic output device 118 may be a physical and/or a non-physical actuator. Possible physical actuators include but are not limited to eccentric rotating mass ("ERM") actuators in which an eccentric mass is moved by a motor, linear resonant actuators ("LRAs") in which a mass attached to a spring is driven back and forth, piezoelectric actuators, electromagnetic motors in which an eccentric mass is moved by a motor, vibrotactile actuators, inertial actuators, and any combination of actuators described herein. Possible non-physical actuators include but are not limited to electrostatic friction (ESF), ultrasonic surface friction (USF), and any combination of actuators described herein. In another embodiment, haptic output device(s) 118 may use kinesthetic haptic feedback including, for example, solenoids to change the stiffness/damping of the housing of secondary device 110, small air bags that change size in the housing, or shape changing materials.

In the embodiment of FIGS. 1-2, system 100 is "media server-driven" meaning that media server 102 directly transmits or communicates haptic signal 104 and audio-video signal 106 to secondary device 110 and primary viewing device 130, respectively. In a media server-driven embodiment, a user who wishes to view haptically-enhanced content turns or powers on secondary device 110 and primary viewing device 130. For example, primary viewing device 130 may be fed audio-video signal 106 from media server 102 via a set-top box, using an app running on the TV CPU, or through a direct over-the-air digital broadcast. Secondary device 110 establishes a data connection with media server 102. In an embodiment, secondary device 110 may require an app associated with the content (e.g., an app created by the source/owner of the haptic content), or may need to connect to a specific HTTP address via the secondary device's browser. As media server 102 streams or otherwise transmits audio-video signal 106 to primary viewing device 130, media server 102 also simultaneously streams or otherwise serves haptic signal 104 to secondary device 110.

Figure 3:
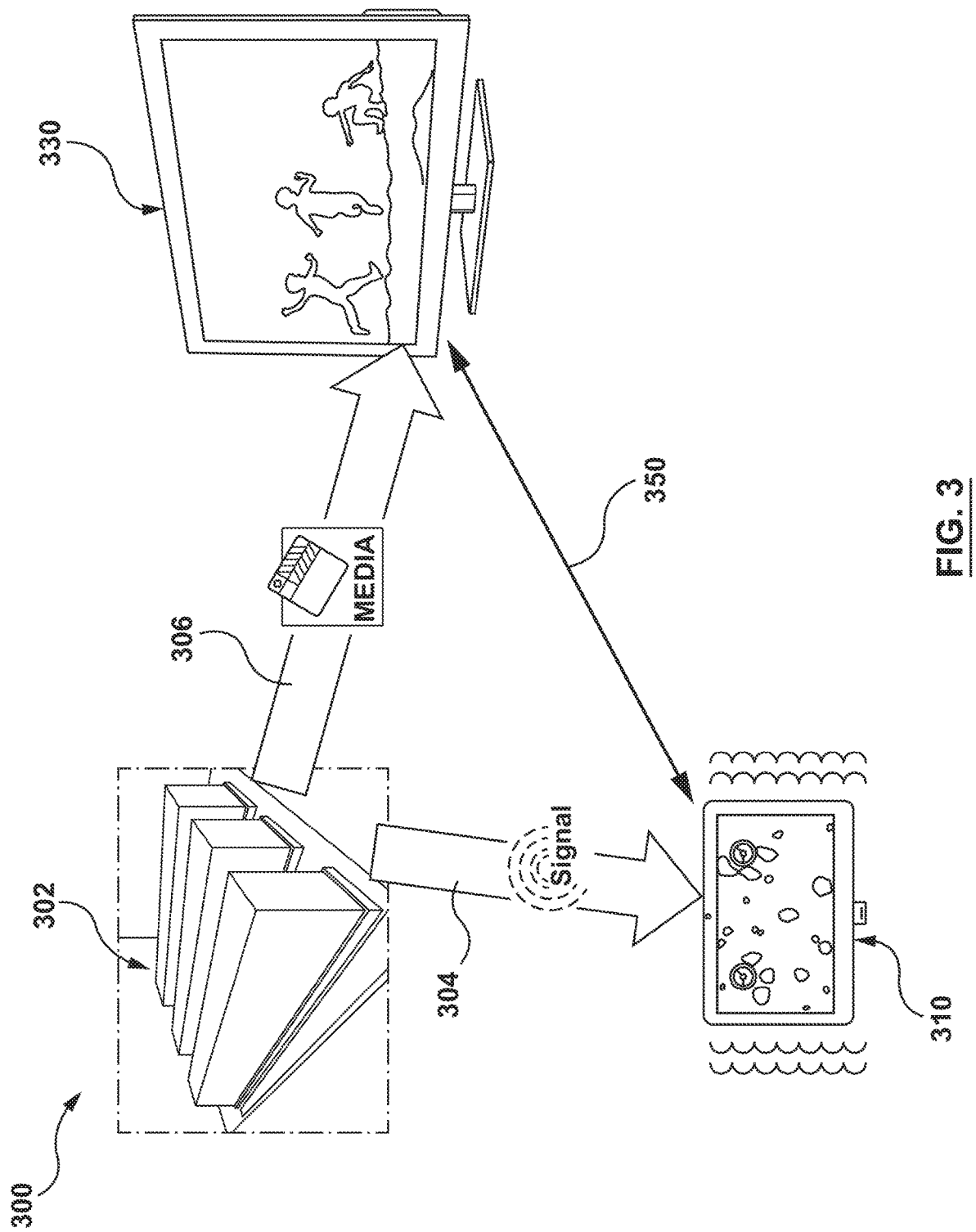
FIG. 3 is an illustration of a multi-device system according to another embodiment hereof, the multi-device system including a media server, a primary viewing device, and a secondary device, wherein the media server delivers audio-video content to the primary viewing device and haptic content to the secondary device and a playback locator signal is utilized to ensure synchronization of the audio-video content and haptic content.
Figure 4:
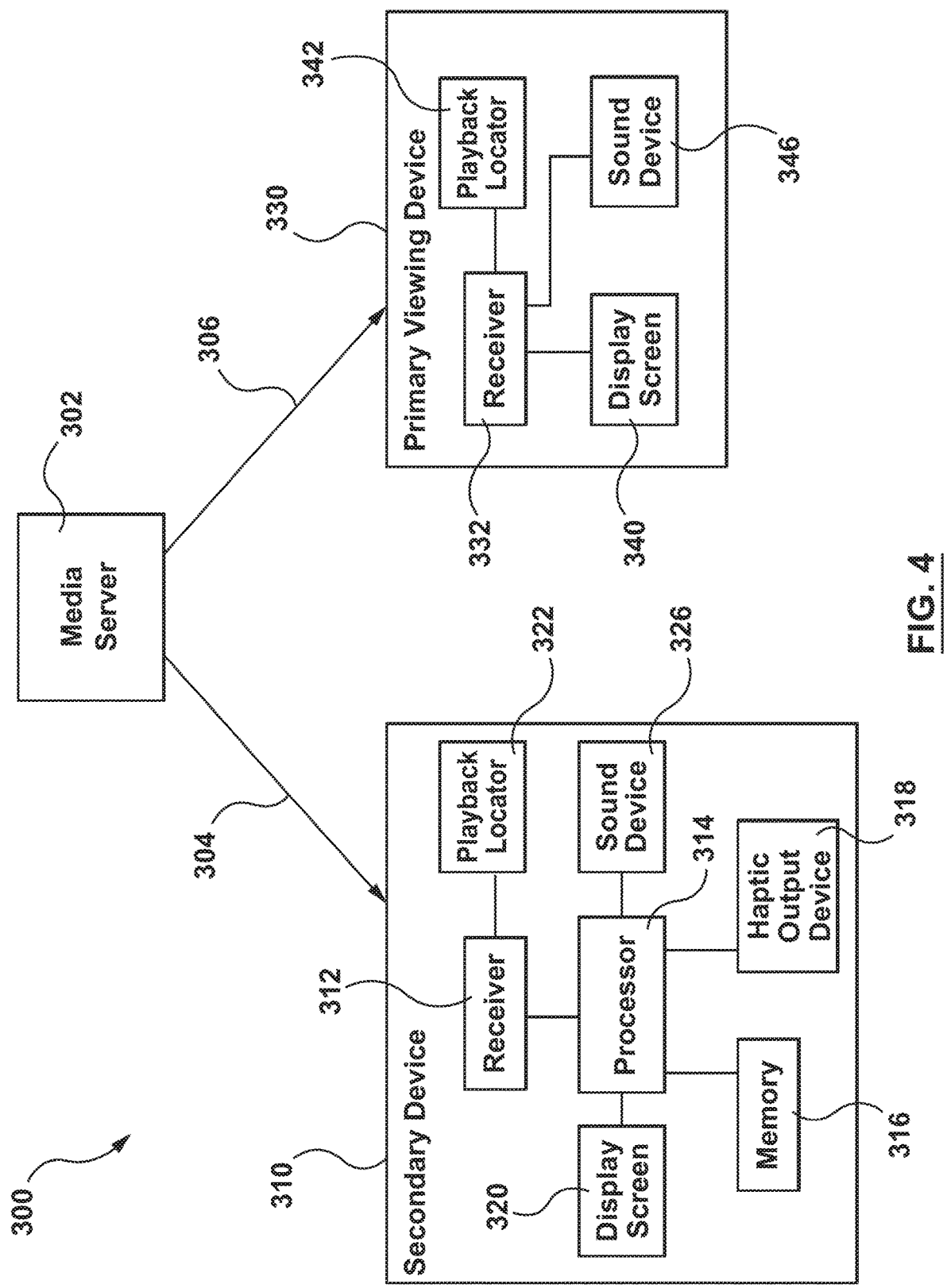
FIG. 4 is a block diagram of the system of FIG. 3.

In an embodiment hereof, the multi-device system may include means to ensure synchronization of the haptic content being output on the secondary device and the audio-video content being output on the primary viewing device. More particularly, with reference to FIGS. 3 and 4, a multi-device system 300 according to an embodiment hereof is shown. FIG. 3 is a schematic illustration of system 300, while FIG. 4 is a block diagram thereof. System 300 includes a media server 302, a primary viewing device 330, and a secondary device 310. Similar to multi-device system 100, multi-device system 300 is media server-driven such that media server 302 directly communicates with primary viewing device 330 in order to transmit or send an audio-video signal 306 to the primary viewing device and also directly communicates with secondary device 310 in order to transmit or send a haptic signal 304 to the secondary device. Similar to the components of multi-device system 100 described above and as shown on the block diagram of FIG. 4, primary viewing device 330 includes a receiver 332, a sound device 346, and a display screen 340 while secondary device 310 includes a receiver 312, a processor 314, a memory 316, at least one haptic output device 318, a display screen 320, and a sound device 326. However, in this embodiment, primary viewing device 330 and secondary device 310 communicate in order to ensure synchronization of the content being output on the respective devices. A playback locator signal 350 is communicated between primary viewing device 330 and secondary device 310. Playback locator signal 350 may be communicated through any means, wired or wirelessly, including a communications path that flows through media server 302. In an embodiment, playback locator signal 350 may be communicated through non-perceptible modifications to the audio and/or video signals to encode and broadcast timing information from the primary viewing device.

More particularly, secondary device 310 includes a playback locator 322 and primary viewing device 330 includes a playback locator 342. Playback locators 322, 342 function to determine a temporal reference point for haptic signal 304, audio-video signal 306, respectively. The temporal reference point may be, for example, time-code, a counter, number of seconds of media playback consumed, current temporal playback position in the media file, or any other indication of playback position. Playback locator 342 of primary viewing device 330 communicates playback position on occasion to playback locator 322 of secondary device 310, or vice versa. Secondary device 310 uses the received playback position location information to ensure that the haptic portion of haptic signal 304 is rendered in a sufficiently synchronized fashion with audio-video signal 306 being rendered on primary viewing device 330.

Figure 5:
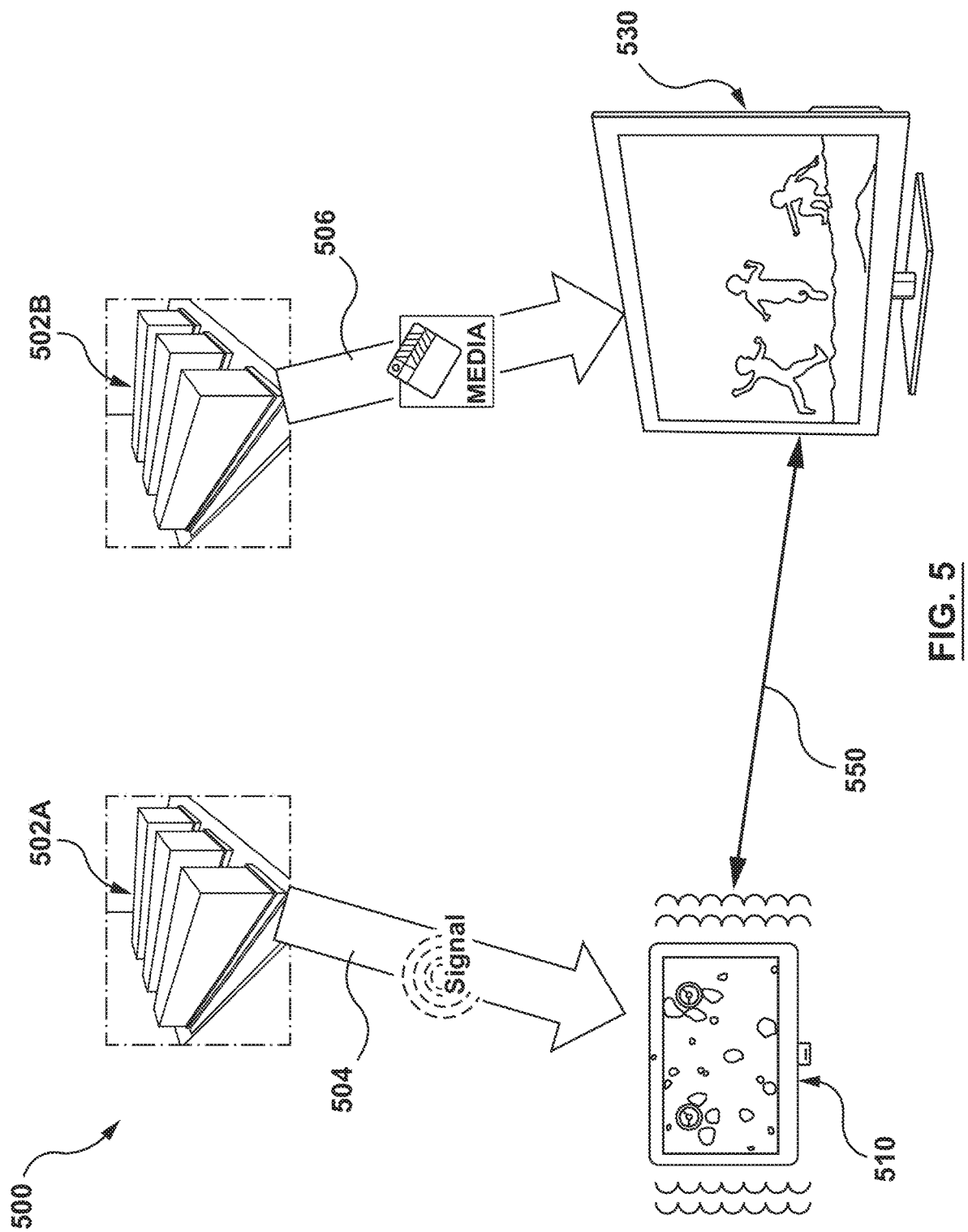
FIG. 5 is an illustration of a multi-device system according to another embodiment hereof, the multi-device system including two media servers, a primary viewing device, and a secondary device, wherein a first media server delivers audio-video content to the primary viewing device and a second media server delivers haptic content to the secondary device and a playback locator signal is utilized to ensure synchronization of the audio-video content and haptic content.
Figure 6:
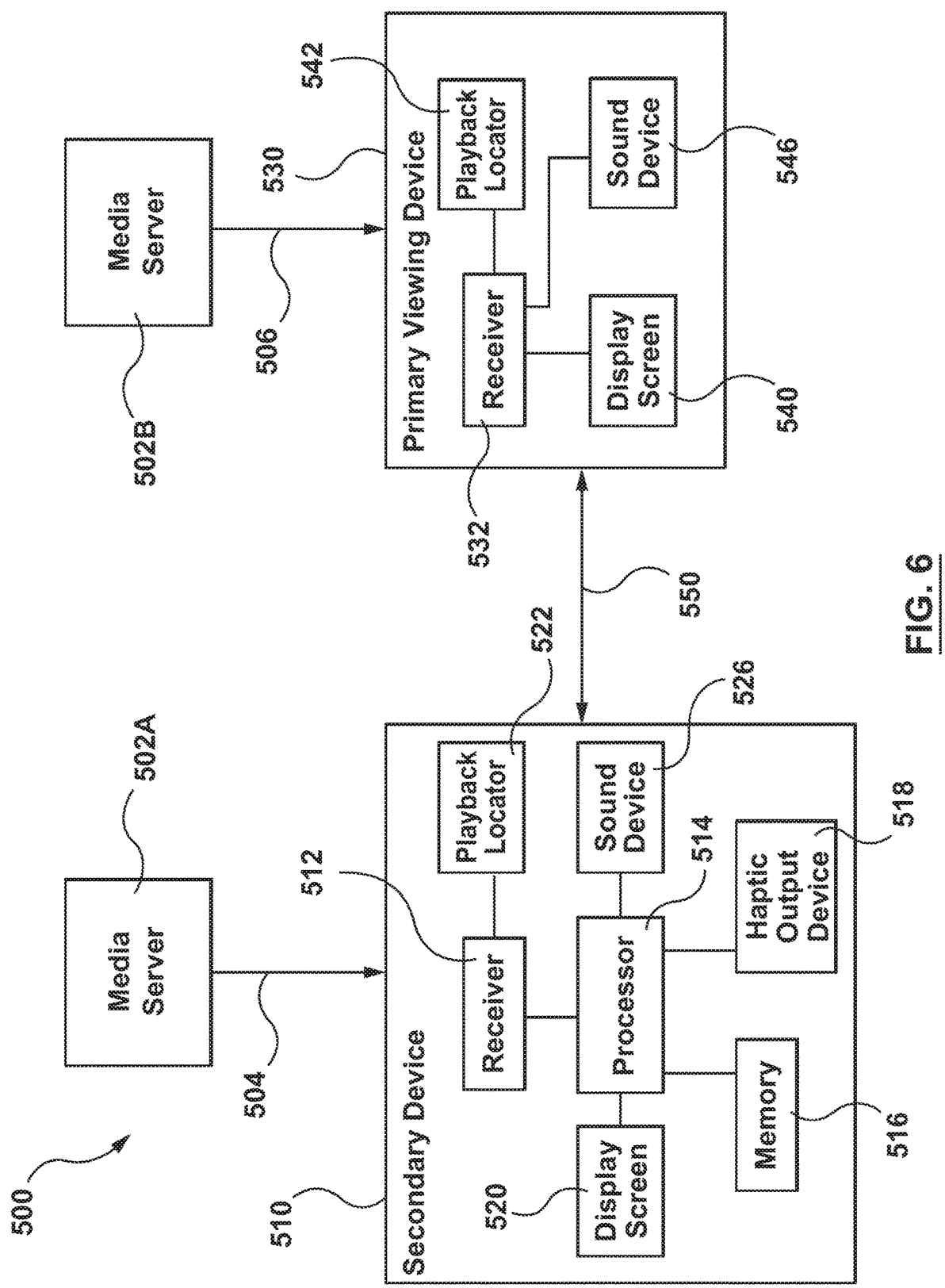
FIG. 6 is a block diagram of the system of FIG. 4.

Although shown with only a single server for delivering both haptic and audio-video signals, in another embodiment hereof, the multi-device system may include two distinct or separate servers for delivering the haptic content to the secondary device and the audio-video content to the primary viewing device. Stated another way, one or more media servers described herein may be considered a media server system. More particularly, with reference to FIGS. 5 and 6, a multi-device system 500 according to an embodiment hereof is shown. FIG. 5 is a schematic illustration of system 500, while FIG. 6 is a block diagram thereof. System 500 includes a first media server 502A, a second media server 502B, a primary viewing device 530, and a secondary device 510. The audio-video content and the haptic content are thus sourced from separate and distinct media servers 502A, 502B. Media server 502B directly communicates with primary viewing device 530 in order to transmit or send an audio-video signal 506 to the primary viewing device and media server 502A directly communicates with secondary device 510 in order to transmit or send a haptic signal 504 to the secondary device. Similar to embodiments described above and as shown on the block diagram of FIG. 6, primary viewing device 530 includes a receiver 532, a sound device 546, and a display screen 540 while secondary device 510 includes a receiver 512, a processor 514, a memory 516, at least one haptic output device 518, a display screen 520, and a sound device 526. In addition, similar to the embodiment of FIGS. 3-4, primary viewing device 530 and secondary device 510 communicate in order to ensure synchronization of the content being output on the respective devices. Secondary device 510 includes a playback locator 522, primary viewing device 530 includes a playback locator 542, and a playback locator signal 550 is communicated between primary viewing device 530 and secondary device 510.

According to another embodiment hereof, the multi-device system may be "secondary device-driven" meaning that the media server(s) only directly transmit or serve data signals to the secondary device. More particularly, in a secondary device-driven embodiment, the media server transmits the full complement of signals—audio, video, haptic—to the secondary device. The secondary device then, in turn, beams or transmits at least the audio-video portion of the signal to the primary viewing device while the secondary device renders the haptic content. In a secondary device-driven embodiment, the secondary device would be configured to connect to the media server and receive the audio-video and haptic content. The secondary device would then establish a connection to the primary viewing device, via wired or wireless communication means, in order to send the audio-video content to the primary viewing device for display thereon.

Figure 7:
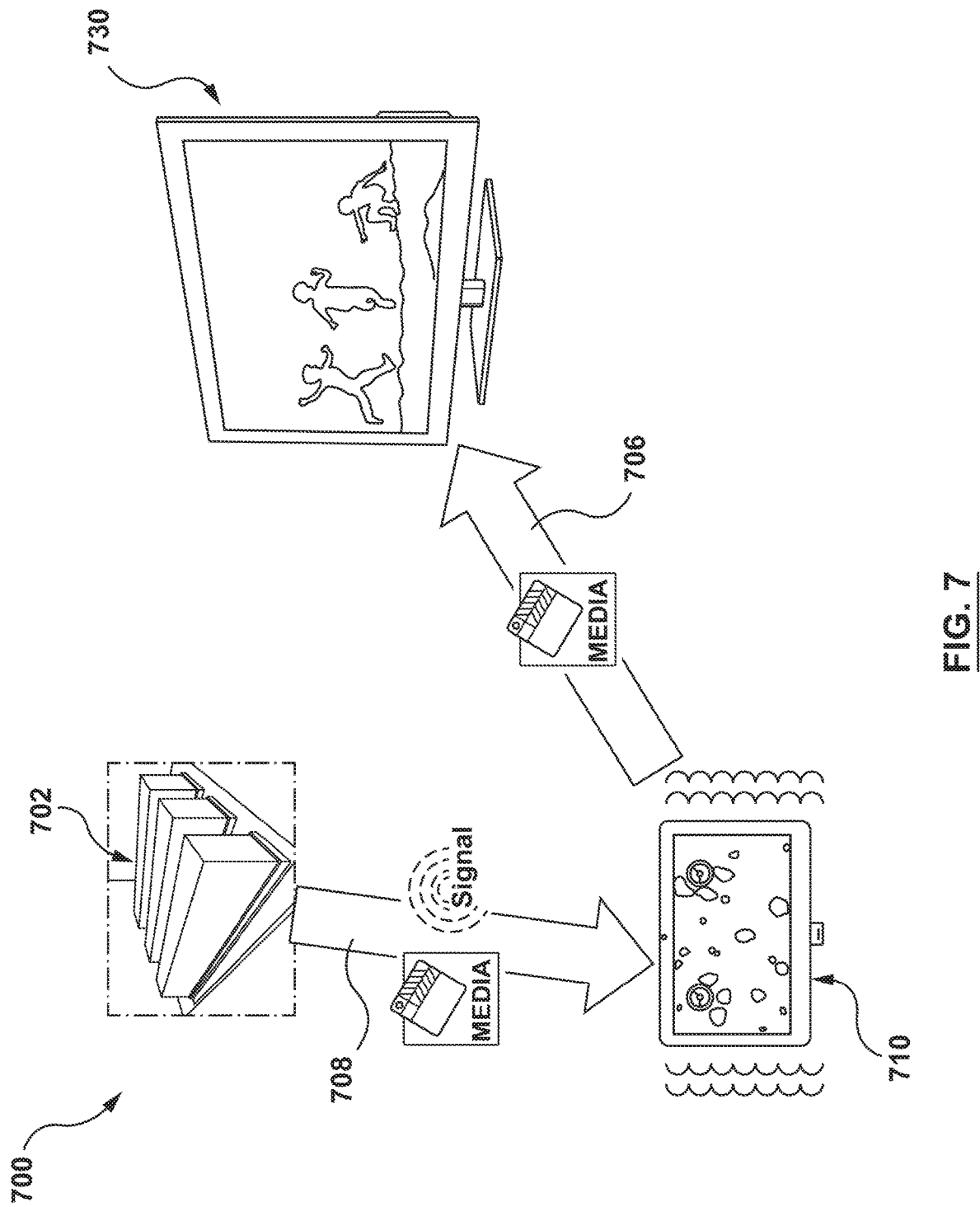
FIG. 7 is an illustration of a multi-device system according to another embodiment hereof, the multi-device system including a media server, a primary viewing device, and a secondary device, wherein the media server delivers audio-video content and haptic content to the secondary device and the secondary device delivers at least the audio-video content to the primary viewing device.
Figure 8:
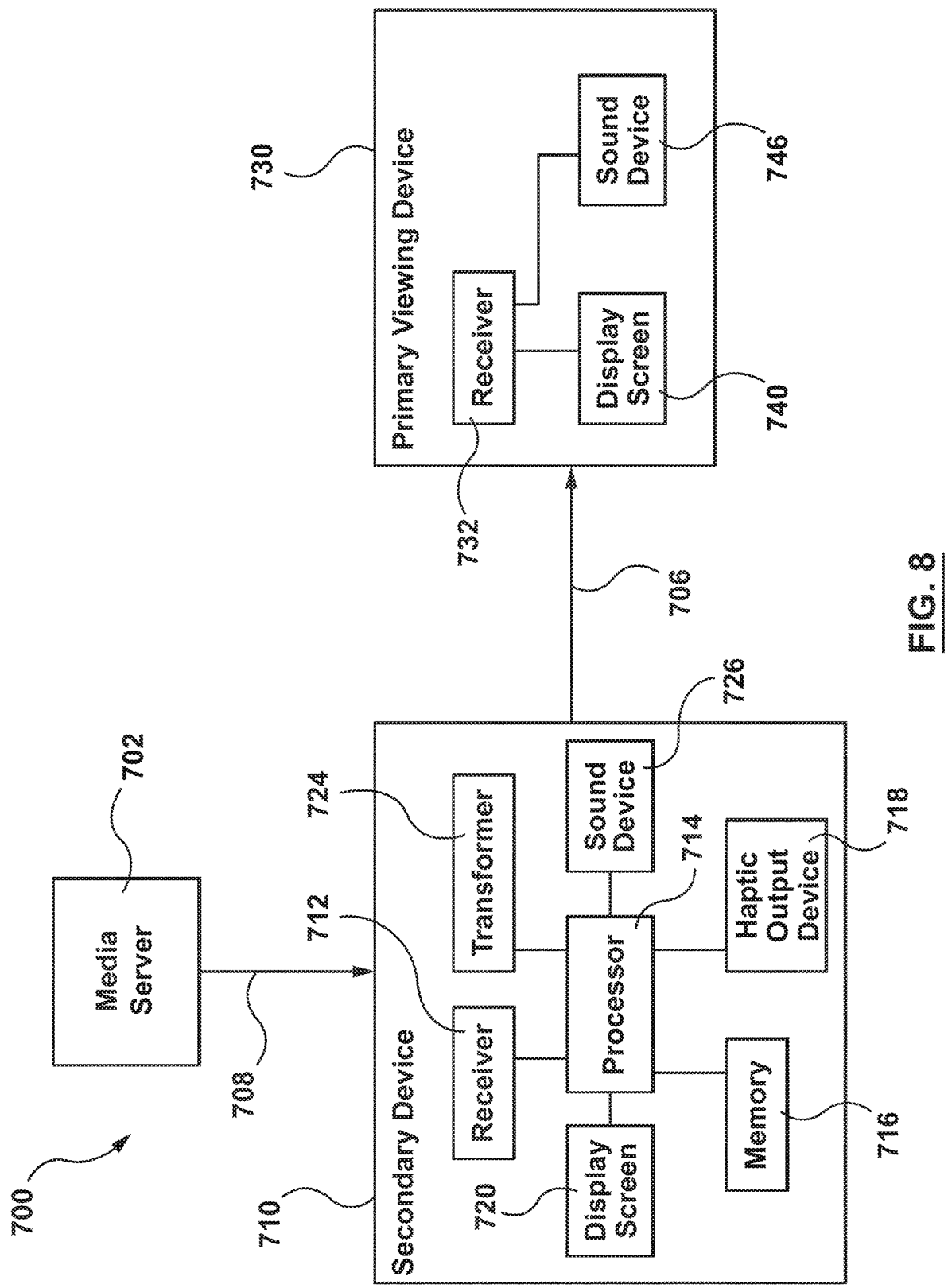
FIG. 8 is a block diagram of the system of FIG. 7.

More particularly, a secondary device-driven embodiment is shown in FIGS. 7-8. A multi-device system 700 includes a media server 702, a primary viewing device 730, and a secondary device 710. Similar to embodiments described above and as shown on the block diagram of FIG. 8, primary viewing device 730 includes a receiver 732, a sound device 746, and a display screen 740 while secondary device 710 includes a receiver 712, a processor 714, a memory 716, at least one haptic output device 718, a display screen 720, and a sound device 726. Multi-device system 700 is secondary device-driven in that media server 702 directly communicates only with secondary device 710. Media server 702 transmits or sends a composite signal 708 to secondary device 710. Composite signal 708 includes video content or data, audio content or data, and haptic content or data, such portions being delivered either interleaved in temporal order, or such portions being delivered unordered, but containing sequencing information that can be interpreted for re-assembly in the correct temporal order for presentation to users by secondary device 710. Stated another way, haptic content or data of composite signal 708 may be included discretely as a separate or independent portion within the overall media signal or in another embodiment hereof, the haptic content or data may be embedded within audio and/or visual content or data as well and then extracted therefrom.

Secondary device 710, upon receiving composite signal 708, recognizes the haptic portion thereof and decodes it for playback with receiver 712. In response to the haptic commands within composite signal 708, processor 714 instructs haptic output device 718 to output haptic effects. In an embodiment, secondary device 710 may also present or output the audio and video portions of composite signal 708 to the user via sound device 726 and display screen 720, respectively. In another embodiment, secondary device 710 may present or output other audio and video content via sound device 726 and display screen 720, respectively, from other sources.

In addition, upon receiving composite signal 708, secondary device 710 recognizes the audio-video portion thereof. Secondary device 710 includes a transformer 724 that communicates at least the audio-video portion of composite signal 708 to primary viewing device 730. In the embodiment of FIGS. 7-8, secondary device 710 extracts or strips the audio-video portion from composite signal 708 and transformer 724 communicates only an audio-video signal 706 to primary viewing device 730. In other words, the haptic portion of composite signal 708 is removed before secondary device 710 outputs a signal to primary viewing device 730. Such removal may be necessary if primary viewing device 730 is incapable of interpreting composite signal 708 having a haptic portion. In addition to removing the haptic portion of composite signal 708, transformer 724 may be required to modify or transform audio-video signal 706 into a format that primary viewing device 730 can interpret and display. Audio-video signal 706 is communicated from secondary device 710 to primary viewing device 730 via wired or wireless communication means.

In another embodiment (not shown), secondary device 710 may transmit composite signal 708 to primary viewing device 730 without modification or transformation thereof. In such an embodiment, primary viewing device 730 may ignore the haptic portion of composite signal 708 or render haptic effects through whatever means the primary viewing device has available for additional viewers.

Figure 9:
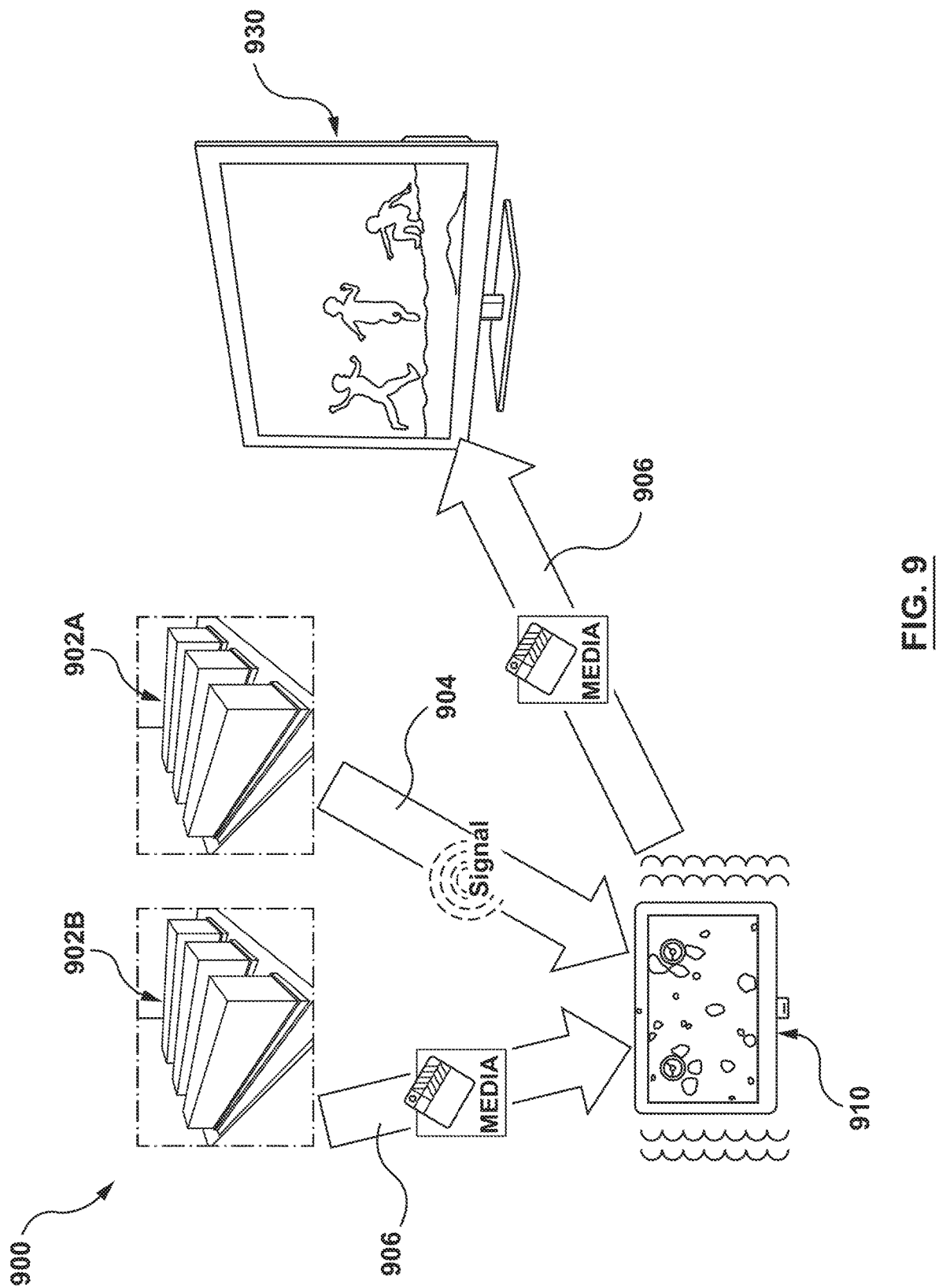
FIG. 9 is an illustration of a multi-device system according to another embodiment hereof, the multi-device system including two media servers, a primary viewing device, and a secondary device, wherein a first media server delivers audio-video content to the secondary device, a second media server delivers haptic content to the secondary device, and the secondary device delivers at least the audio-video content to the primary viewing device.
Figure 10:
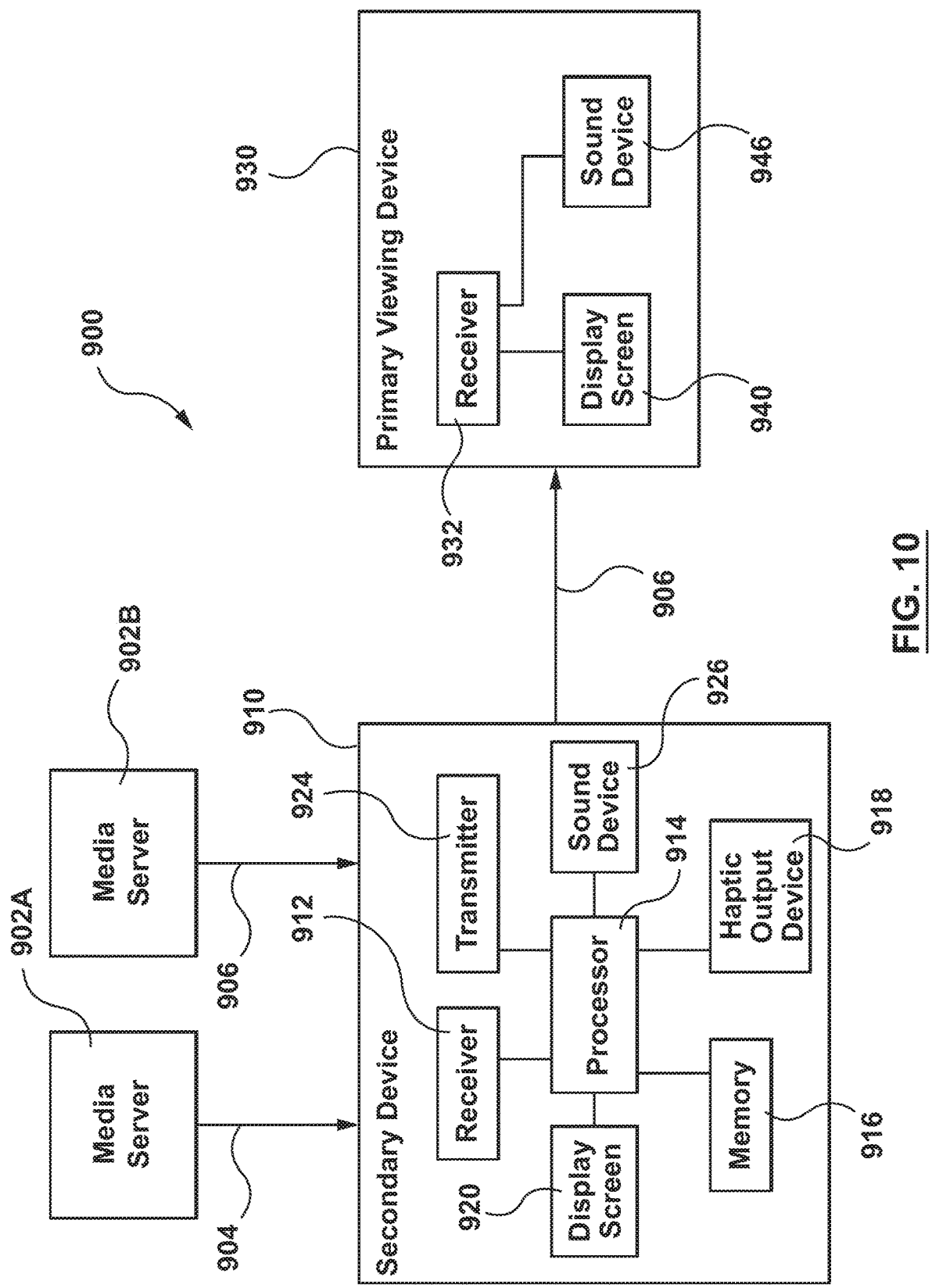
FIG. 10 is a block diagram of the system of FIG. 9.

Although the secondary device-driven embodiment of FIGS. 7-8 is shown with only a single server for delivering a composite signal, in another embodiment hereof, the multi-device system may include two distinct or separate servers for separately delivering the haptic content and the audio-video content as distinct or separate signals to the secondary device. More particularly, with reference to FIGS. 9 and 10, a multi-device system 900 according to an embodiment hereof is shown. FIG. 9 is a schematic illustration of system 900, while FIG. 10 is a block diagram thereof. System 900 includes a first media server 902A, a second media server 902B, a primary viewing device 930, and a secondary device 910. The audio-video content and the haptic content are thus sourced from separate and distinct media servers 902A, 902B. Media server 902B directly communicates with secondary device 910 in order to transmit or send an audio-video signal 906 to the secondary device and media server 902A directly communicates with secondary device 910 in order to transmit or send a haptic signal 904 to the secondary device.

Similar to the embodiments described above and as shown on the block diagram of FIG. 10, primary viewing device 930 includes a receiver 932, a sound device 946, and a display screen 940 while secondary device 910 includes a receiver 912, a processor 914, a memory 916, at least one haptic output device 918, a display screen 920, and a sound device 926. Receiver 912 of secondary device 910, upon receiving both haptic signal 904 and audio-video signal 906, synchronizes the signals to ensure that the rendering of the haptic signal 408 remains sufficiently synchronized with the rendering of audio-video signal 906. In response to haptic signal 904, processor 914 instructs haptic output device 918 to output haptic effects. In addition, a transmitter 924 of secondary device 910 communicates audio-video 906 to primary viewing device 930. If required, before transmittal thereof, transmitter 924 may modify or transform audio-video signal 906 into a format that primary viewing device 930 can interpret and display. Although the embodiment of FIGS. 9-10 is shown with two distinct or separate servers, a single server that delivers distinct or separate haptic and audio-video signals (rather than a composite signal such as the embodiment of FIGS. 7-8) may be utilized.

According to another embodiment hereof, the multi-device system may be "primary viewing device-driven" meaning that the media server(s) only directly transmit or serve data signals to the primary viewing device. More particularly, in a primary viewing device-driven embodiment, the media server transmits the full complement of signals—audio, video, tactile—to the primary viewing device. The primary viewing device then, in turn, beams or transmits at least the haptic portion of the signal to the secondary device while the primary viewing device renders the audio-video content. In a primary viewing device-driven embodiment, the primary viewing device would be configured to establish a connection to the secondary device, via wired or wireless communication means, in order to send the haptic content to the secondary device for rendering thereon. The functionality that connects to and serves the haptic content to the secondary device may reside in a set-top box connected to a TV, it may reside in software running on a CPU packaged within a Smart TV, or it may reside on a device such as a media center PC or other device with processing capabilities such as but not limited to an Apple TV, Chromecast, or similar device. The software associated with the primary viewing device would support a secondary device establishing a connection, wired or wireless, to the primary viewing device. The purpose of the connection would be at least in part to transmit the haptic content to the secondary device for rendering.

Figure 11:
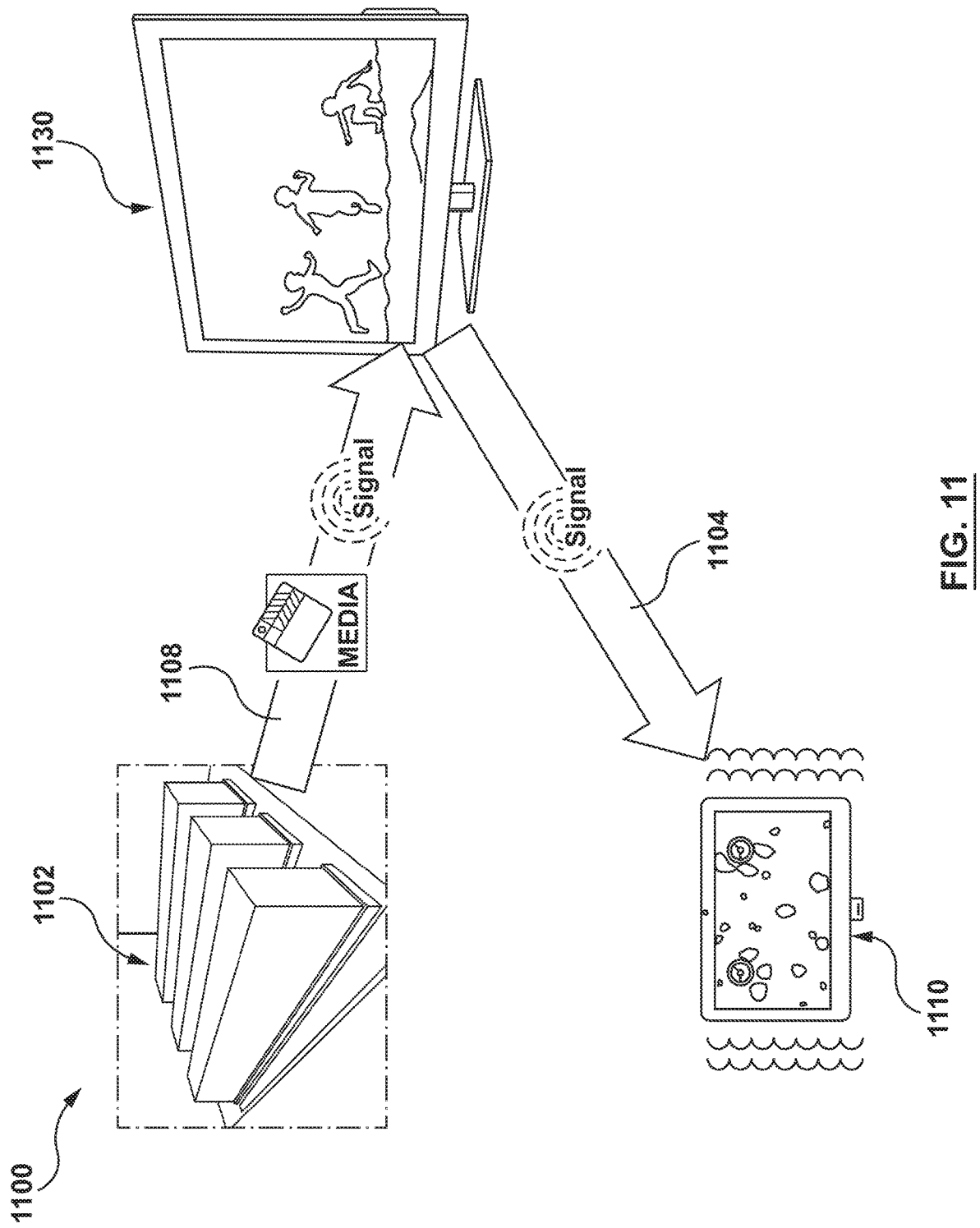
FIG. 11 is an illustration of a multi-device system according to another embodiment hereof, the multi-device system including a media server, a primary viewing device, and a secondary device, wherein the media server delivers audio-video content and haptic content to the primary viewing device and the primary viewing device delivers at least the haptic content to the secondary device.
Figure 12:
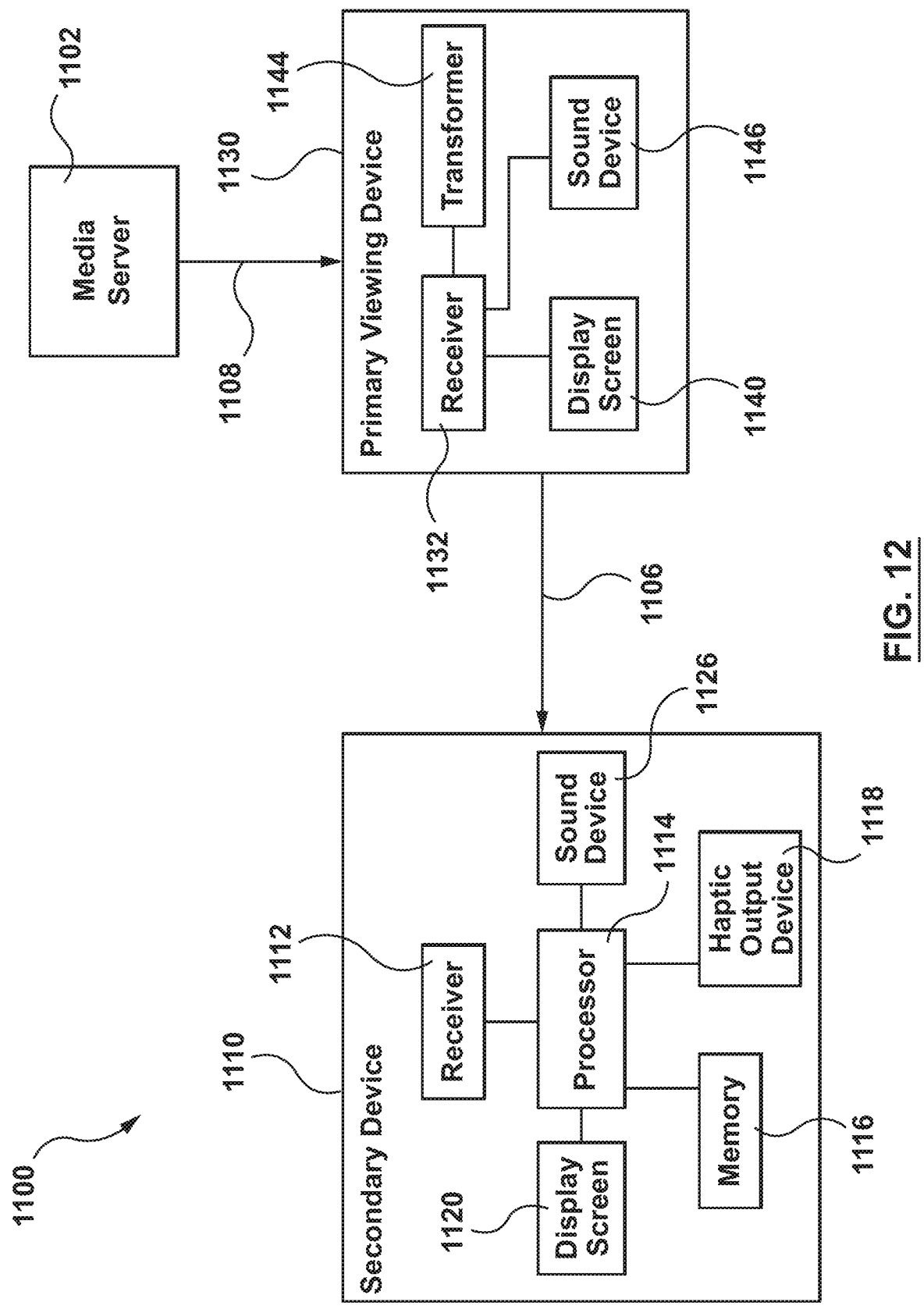
FIG. 12 is a block diagram of the system of FIG. 11.

More particularly, a primary viewing device-driven embodiment is shown in FIGS. 11-12. A multi-device system 1100 includes a media server 1102, a primary viewing device 1130, and a secondary device 1110. Similar to embodiments above and as shown on the block diagram of FIG. 12, primary viewing device 1130 includes a receiver 1132, a sound device 1146, and a display screen 1140 while secondary device 1110 includes a receiver 1112, a processor 1114, a memory 1116, at least one haptic output device 1118, a display screen 1120, and a sound device 1126. Multi-device system 1100 is primary viewing device-driven in that media server 1102 directly communicates only with primary viewing device 1130. Media server 1102 transmits or sends a composite signal 1108 to primary viewing device 1130. Composite signal 1108 includes video content or data, audio content or data, and haptic content or data, such portions being delivered either interleaved in temporal order, or such portions being delivered unordered, but containing sequencing information that can be interpreted for re-assembly in the correct temporal order for presentation to users by primary viewing device 1130. Stated another way, haptic content or data of composite signal 1108 may be included discretely as a separate or independent portion within the overall media signal or in another embodiment hereof, the haptic content or data may be embedded within audio and/or visual content or data as well and then extracted therefrom.

Primary viewing device 1130, upon receiving composite signal 1108, recognizes the audio-video portion thereof and outputs the audio-video content via display screen 1140 and sound device 1146. In addition, upon receiving composite signal 1108, primary viewing device 1130 recognizes the haptic portion thereof. Primary viewing device 1130 includes a transformer 1144 that communicates at least the haptic portion of composite signal 1108 to secondary device 1110. In the embodiment of FIGS. 11-12, primary viewing device 1130 extracts or strips the haptic portion from composite signal 1108 and transformer 1144 communicates only a haptic signal 1104 to secondary device 1110 for rendering of haptic effects. In other words, the audio-video portion of composite signal 1108 is removed before primary viewing device 1130 outputs a signal to secondary device 1110. Haptic signal 1104 is communicated from primary viewing device 1130 to secondary device 1110 via wired or wireless communication means.

In another embodiment (not shown), primary viewing device 1130 may transmit composite signal 1108 to secondary device 1110 without modification or transformation thereof. In such an embodiment, secondary device 1110 may ignore the audio-video portion of composite signal 1108 or output the audio-video content via display screen 1120 and sound device 1126.

Figure 13:
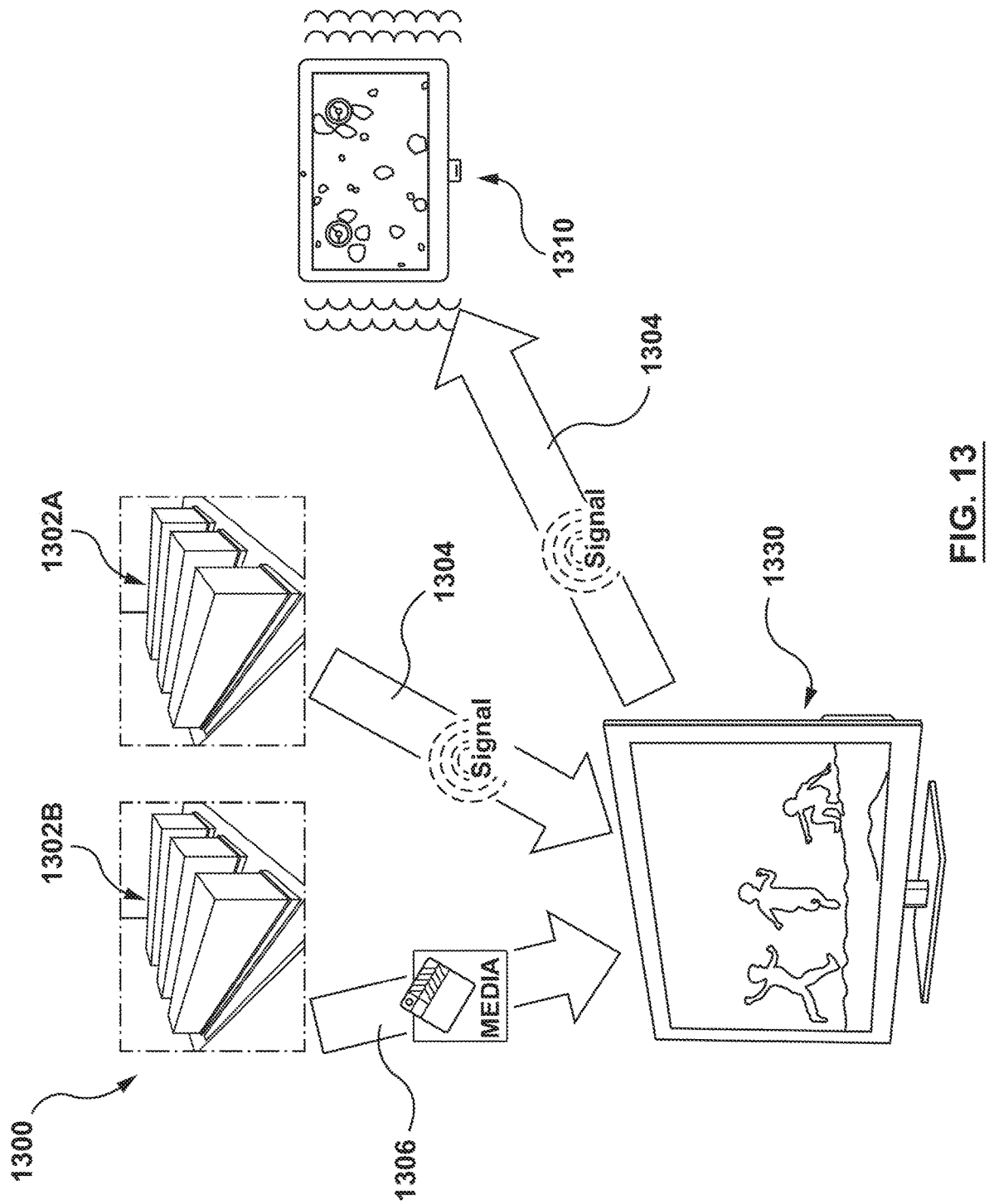
FIG. 13 is an illustration of a multi-device system according to another embodiment hereof, the multi-device system including two media servers, a primary viewing device, and a secondary device, wherein a first media server delivers audio-video content to the primary viewing device, a second media server delivers haptic content to the primary viewing device, and the primary viewing device delivers at least the haptic content to the secondary device.
Figure 14:
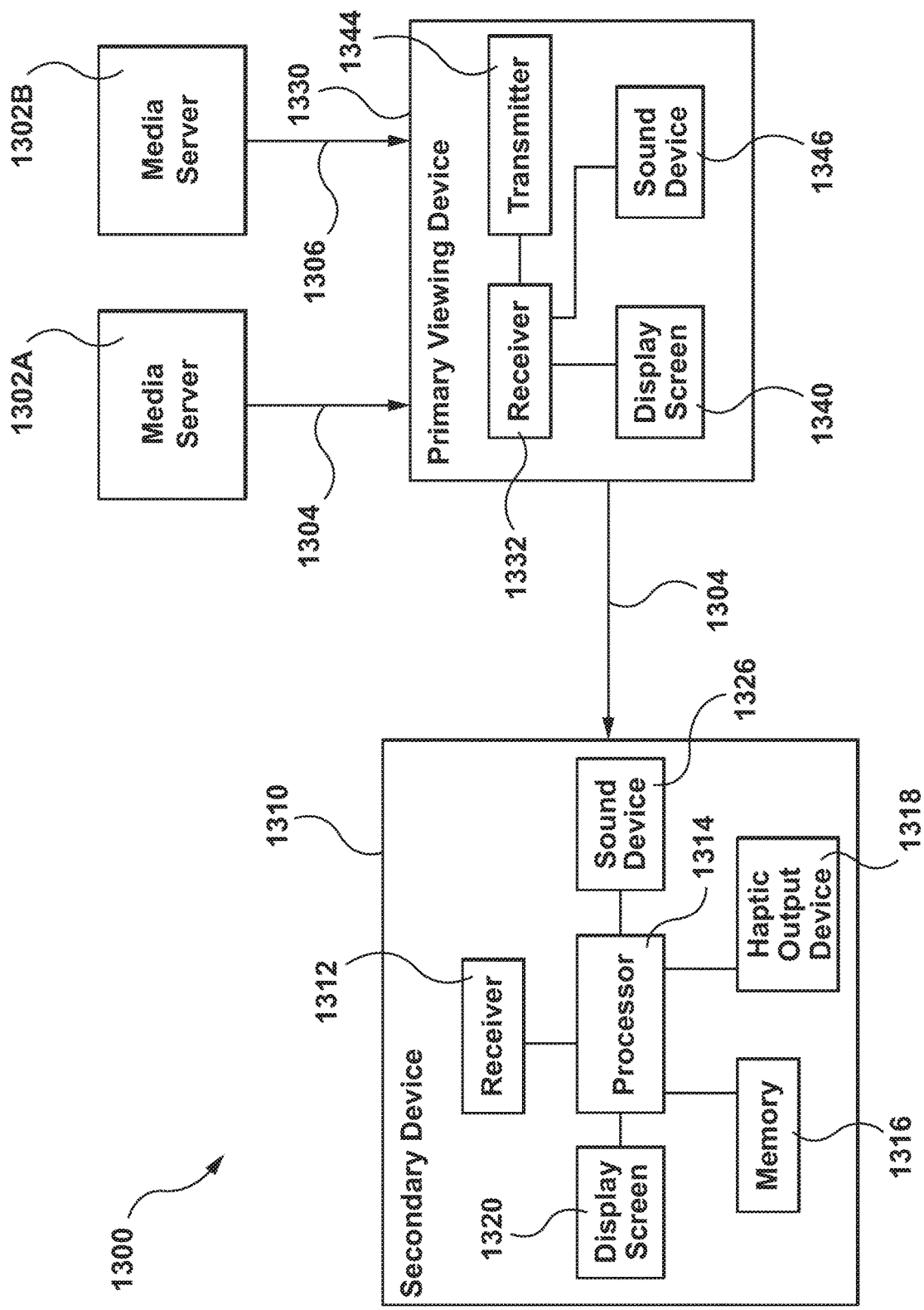
FIG. 14 is a block diagram of the system of FIG. 13.

Although the primary viewing device-driven embodiment of FIGS. 11-12 is shown with only a single server for delivering a composite signal, in another embodiment hereof, the multi-device system may include two distinct or separate servers for separately delivering the haptic content and the audio-video content to the primary viewing device. More particularly, with reference to FIGS. 13 and 14, a multi-device system 1300 according to an embodiment hereof is shown. FIG. 13 is a schematic illustration of system 1300, while FIG. 14 is a block diagram thereof. System 1300 includes a first media server 1302A, a second media server 1302B, a primary viewing device 1330, and a secondary device 1310. The audio-video content and the haptic content are thus sourced from separate and distinct media servers 1302A, 1302B. Media server 1302B directly communicates with primary viewing device 1330 in order to transmit or send an audio-video signal 1306 to the primary viewing device and media server 1302A directly communicates with primary viewing device 1330 in order to transmit or send a haptic signal 1304 to the primary viewing device.

Similar to the embodiments described above and as shown on the block diagram of FIG. 14, primary viewing device 1330 includes a receiver 1332, a sound device 1346, and a display screen 1340 while secondary device 1310 includes a receiver 912, a processor 1314, a memory 1316, at least one haptic output device 1318, a display screen 1320, and a sound device 1326. Receiver 1332 of primary viewing device 1330, upon receiving both haptic signal 1304 and audio-video signal 1306, synchronizes the signals to ensure that the rendering of haptic signal 1308 remains sufficiently synchronized with the rendering of audio-video signal 1306. In addition, a transmitter 1344 of primary viewing device 1330 communicates haptic signal 1304 to secondary device 1310 for rendering of the haptic effects. Although the embodiment of FIGS. 13-14 is shown with two distinct or separate servers, a single server that delivers distinct or separate haptic and audio-video signals (rather than a composite signal such as the embodiment of FIGS. 11-12) may be utilized.

Figure 15:
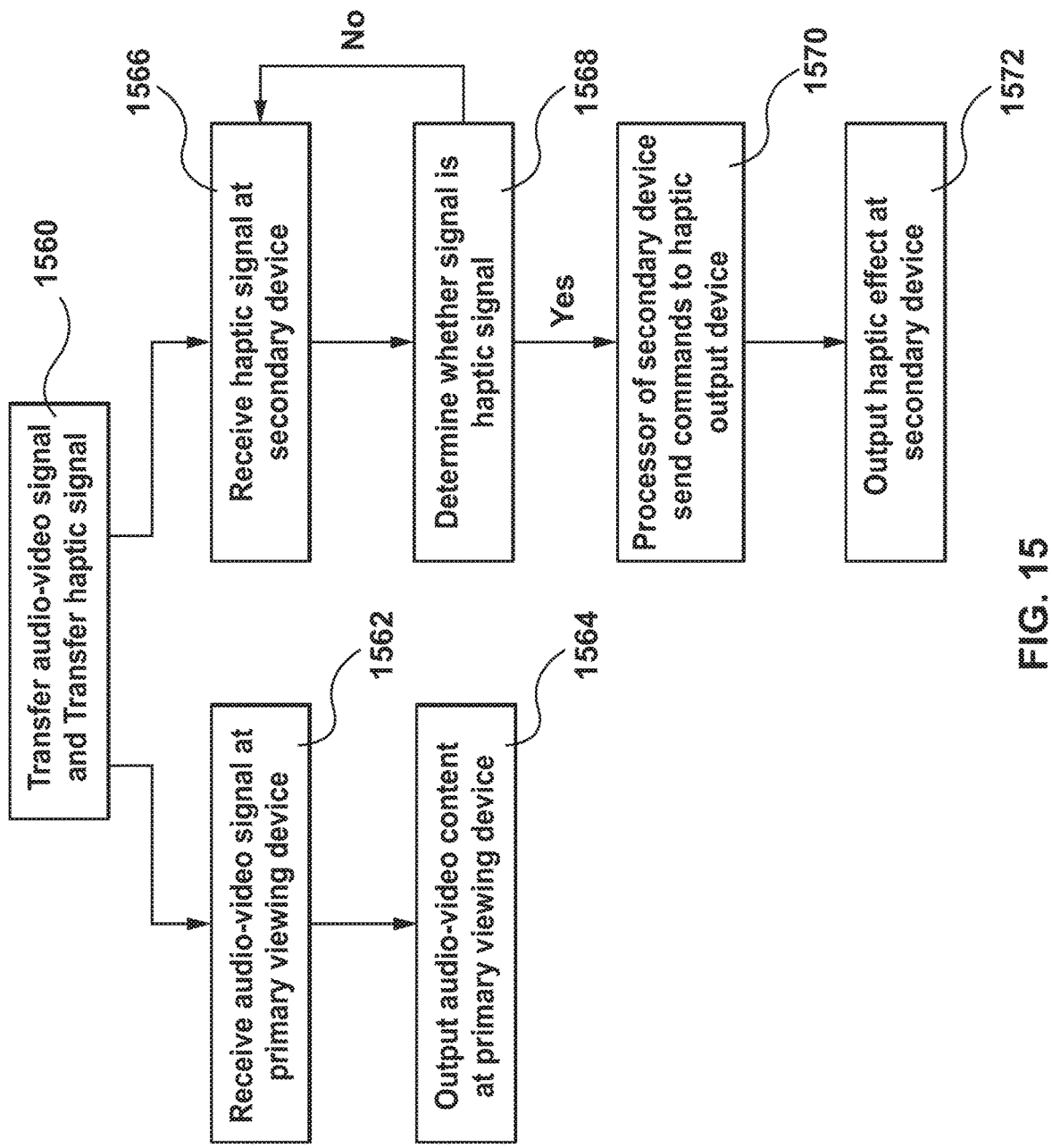
FIG. 15 is a flow diagram of a method of conveying a haptic effect to a viewer of audio-video content, according to an embodiment hereof.

FIG. 15 is a flow diagram for conveying a haptic effect to a viewer of audio-video content, according to one embodiment of the present invention. In an embodiment, the functionality of the flow diagram of FIG. 15 is implemented by software stored in the memory of the secondary device and executed by the processor of the secondary device, and/or by the primary viewing device. In other embodiments, the functionality may be performed by hardware through the use of an application specific integrated circuit ("ASIC"), a programmable gate array ("PGA"), a field programmable gate array ("FPGA"), or any combination of hardware and software.

At step 1560, an audio-video signal having audio-video content and a haptic signal having haptic content is transferred from at least one media server system. The haptic content is associated with the audio-video content. The audio-video signal and haptic signal may be separately sent as distinct signals from one or more media servers, or the audio-video signal and haptic signal may be sent as a composite from a media server. If in a media server-driven embodiment, the audio-video signal and haptic signal are sent as distinct signals directly to the primary viewing device and the secondary device, respectively. If in a primary viewing device-driven embodiment, both signals are transferred to the primary viewing device and then the at least the haptic signal is transferred to the secondary device from the primary viewing device. If in a secondary device-driven embodiment, both signals are transferred to the secondary device and then at least the audio-video signal is transferred to the primary viewing device from the secondary device.

At step 1562, the primary viewing device receives the audio-video signal including audio-video content. If in a media server-driven embodiment or primary viewing device-driven embodiment, the audio-video signal is sent from a media server. If in a secondary device-driven embodiment, the audio-video signal is sent from a secondary device. Upon receiving the audio-video signal, the primary viewing device outputs the audio-video content thereon at step 1564.

At step 1566, the secondary device receives the haptic signal including haptic content. If in a media server-driven embodiment or secondary device-driven embodiment, the haptic signal is sent from a media server. If in a primary viewing device-driven embodiment, the haptic signal is sent from a primary viewing device.

Upon receiving the haptic signal, the processor of the secondary device determines whether the signal is a haptic signal at step 1568 or some other non-haptic related signal. If it is determined that the signal is not a haptic signal, the processor continues to function without applying any haptic effect to the user and waits to receive another signal from the media server and/or primary viewing device. If it is determined that the signal is a haptic signal, then the processor will send a command or instruction to the haptic output device at step 1570 and then the haptic output device will output the instructed haptic effect at step 1572. The haptic effects that are output by the haptic output device can include but are not limited to varying degrees of vibrations, varying degrees of detents, or other types of haptic effects.

If the secondary device includes multiple haptic output devices, the processor of the secondary device may determine at which haptic output device each haptic effect is to be executed and provided to the user. In such an embodiment, high level haptic parameters or streaming values are generated in the software code stored in the memory of the secondary device. The parameters or values are processed by the processor and the appropriate voltage level for each haptic output device is thereby generated. This allows the secondary device to provide the appropriate haptic effects to the user and vary the amount or type of haptic effects through the different voltage levels that are generated for each output device.

In an embodiment hereof, the audio-video content may be a virtual video game. More particularly, in such an embodiment, the multi-device system includes a gaming console having software running thereon (i.e., Xbox One or PlayStation 4) and a gaming peripheral being configured to output haptic feedback, such as via rumble motors that may serve as haptic output devices. The software on the gaming console is a media server and a source of the audio-video content and haptic content. The gaming console is the primary viewing device that displays the video game, and the gaming peripheral is the secondary device that outputs the haptic content.

Although multi-device systems described herein include a primary viewing device and a single secondary device, it will be understood by one of ordinary skill in the art that the systems may include multiple secondary devices that each output haptic content and/or multiple primary viewing devices that each output audio-video content. For example, if several users are watching the same, singular primary viewing device, each user may be holding their own secondary device and feeling the haptic effects output thereby. The haptic signal(s), audio-video signal(s), and/or composite signal(s) having both haptic and audio-video content may be concurrently delivered from the media server(s) to several devices. In an embodiment, the primary viewing device and/or media server may do an initial scan or search for any haptically-enabled secondary devices and then the primary viewing device and/or media server delivers at least the haptic signal to each haptically-enabled secondary device that was located in the initial search/scan.

Figure 16:
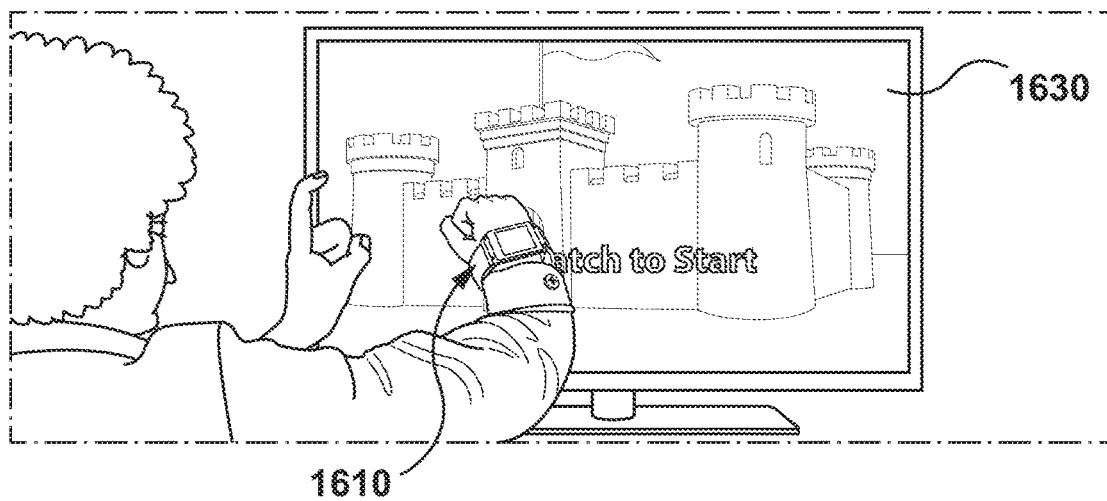
FIG. 16 illustrates a multi-device system according to another embodiment hereof, wherein a primary viewing device and a secondary device of the multi-device system may interact with each other.
Figure 17:
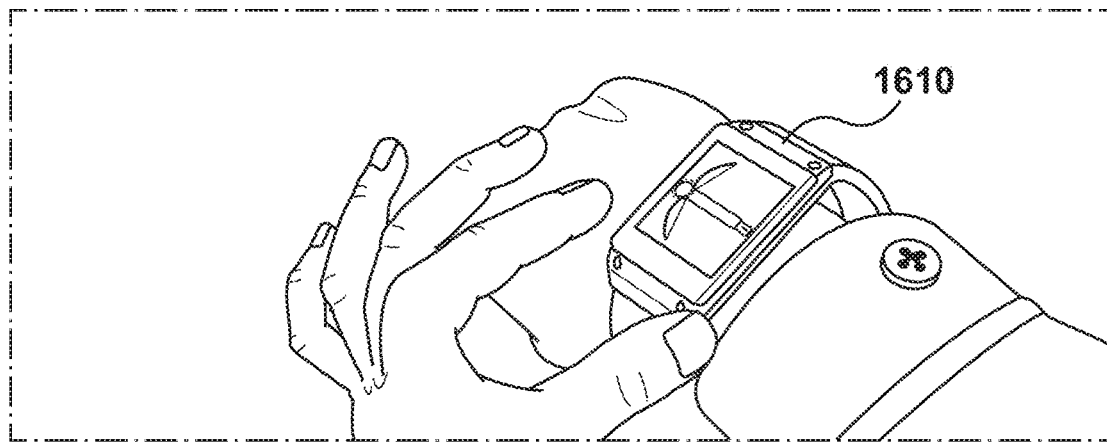
FIG. 17 illustrates a user interacting with the secondary device of FIG. 16, wherein a bow and arrow is displayed on the screen of the secondary device.
Figure 18:
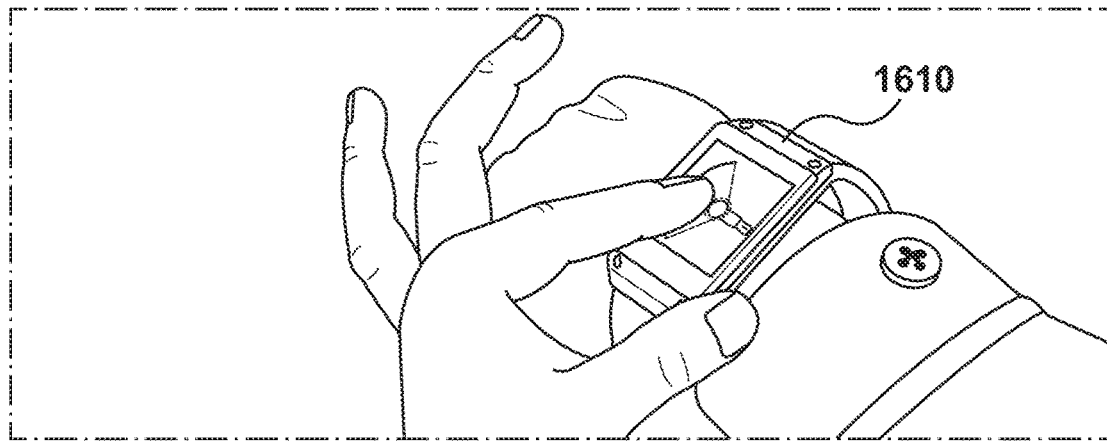
FIG. 18 illustrates a user interacting with the secondary device of FIG. 16, wherein a user deploys the bow and arrow on the screen of the secondary device.
Figure 19:
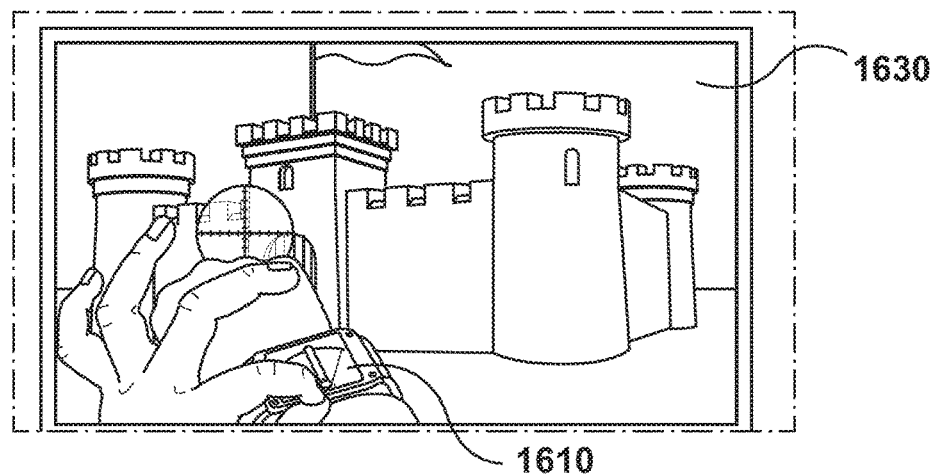
FIG. 19 illustrates the primary viewing device of FIG. 16, wherein a moving target is being displayed on the primary viewing device and the target is associated with the position of the bow and arrow being displayed on the secondary device.
Figure 20:
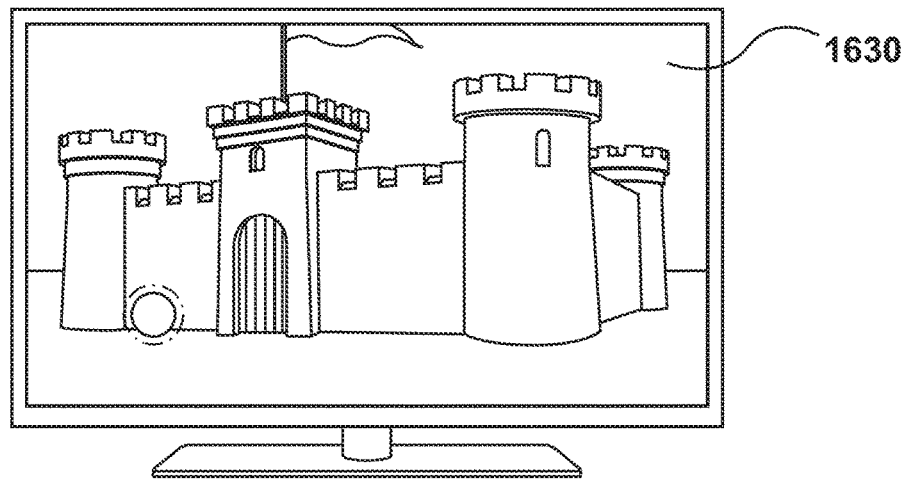
FIG. 20 illustrates the multi-device system of FIG. 16, wherein the arrow has been deployed and is no longer displayed on the secondary device but rather the arrow is then displayed on the primary viewing device.
Figure 21:
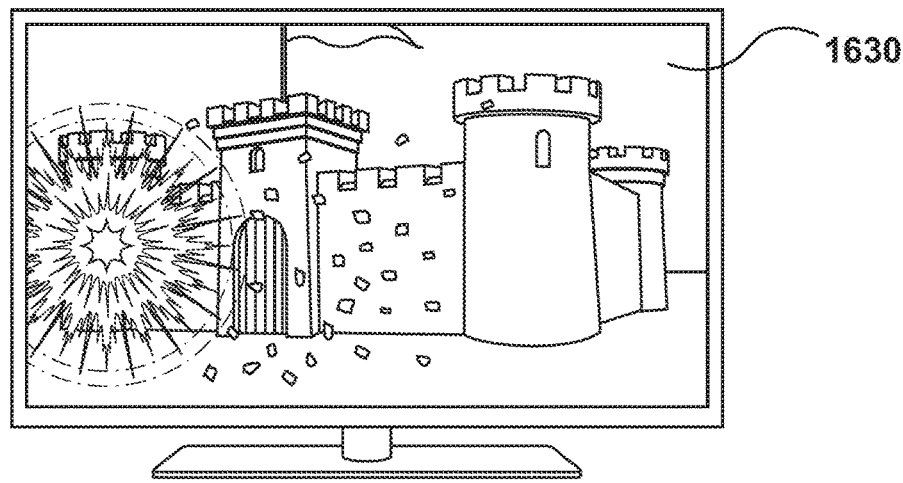
FIG. 21 illustrates the primary viewing device of FIG. 16, wherein the primary viewing device displays the arrow hitting the content on the primary viewing device.

In other embodiments hereof, the primary viewing device and the secondary device may interact with each other. More particularly, a user may interact with the secondary device and such interactions may be displayed on the primary viewing device, thereby making a virtual environment more interactive for users. One example of such interactive second screen haptics is shown in FIGS. 16-21. In this embodiment, as shown in FIG. 16, a multi-device system 1600 includes a gaming console (not shown) having software running thereon, a primary viewing device 1630, and a secondary device 1610. The software on the gaming console is a media server and the source of the audio-video content and haptic content, and primary viewing device 1630 is configured to output the audio-video content received from the media server while secondary device 1610 includes a haptic output device and is configured to output the haptic content received from the media server as a haptic effect via the haptic output device. With reference to FIGS. 17 and 18, a user interacts or controls the content on secondary device 1610. FIG. 17 illustrates a bow and arrow being displayed on the screen of secondary device 1610, while FIG. 18 illustrates a user deploying the bow and arrow on the screen of secondary device 1610. As shown in FIG. 19, a moving target is being displayed on primary viewing device 1630. The target on primary viewing device 1630 is associated with the position of the bow and arrow being displayed on secondary device 1610. As such, when the user moves secondary device 1610 (and the bow and arrow thereon), the target on primary viewing device 1630 moves as well. When a user is ready, he deploys or releases the arrow on secondary device 1610 and the arrow is no longer displayed on the secondary device but rather the arrow is then displayed on primary viewing device 1630 as shown in FIG. 20. After a predetermined elapsed time, primary viewing device 1630 displays the arrow hitting the content on the primary viewing device in FIG. 21 (i.e., the arrow is shown hitting the castle). Systems and methods for transmitting messages including haptic content between two devices in an interactive manner are further described in U.S. Pat. No. 8,976,112 to Birnbaum et al., U.S. Pat. No. 8,638,301 to Birnbaum et al., and U.S. Patent Publication No. 2010/0214243 to Birnbaum et al., each of which is assigned to the same assignee as the present application and each of which is herein incorporated by reference in its entirety.

Figure 22:
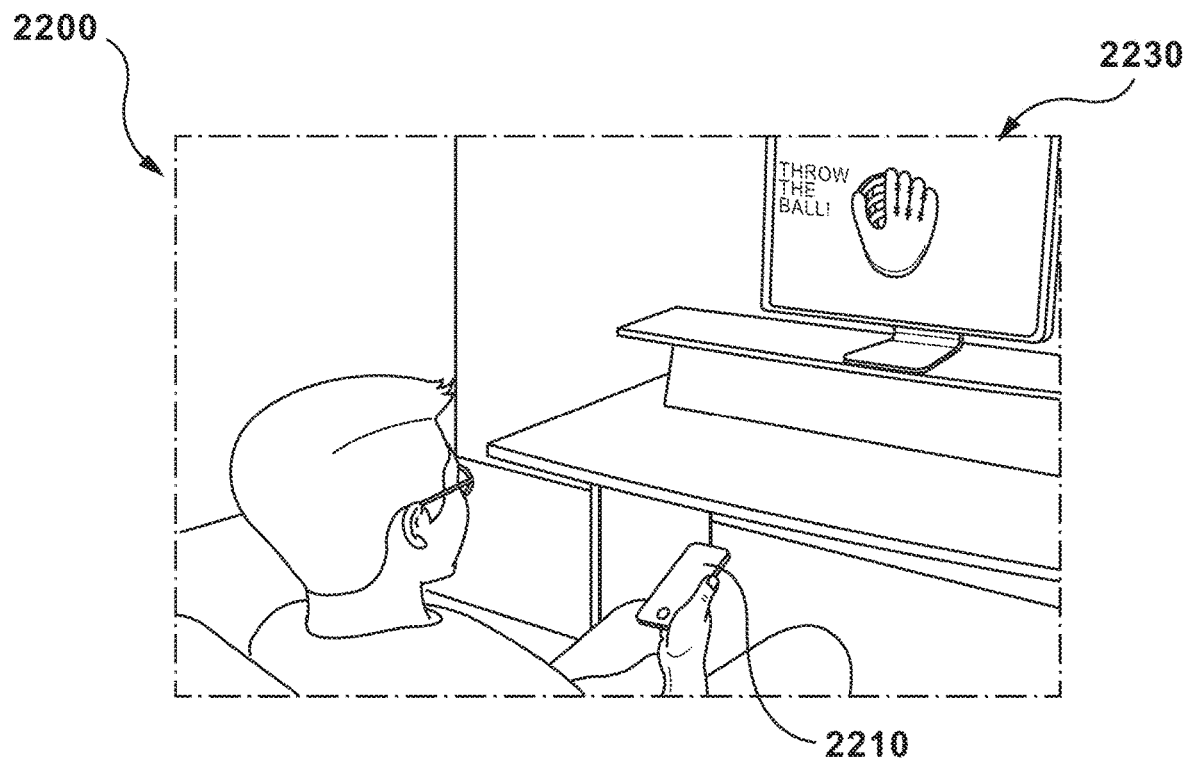
FIG. 22 illustrates another example in which a primary viewing device and a secondary device of a multi-device system may interact with each other, wherein a ball is displayed on the screen of the secondary device and a glove or target is displayed on the screen of the primary viewing device.
Figure 23:
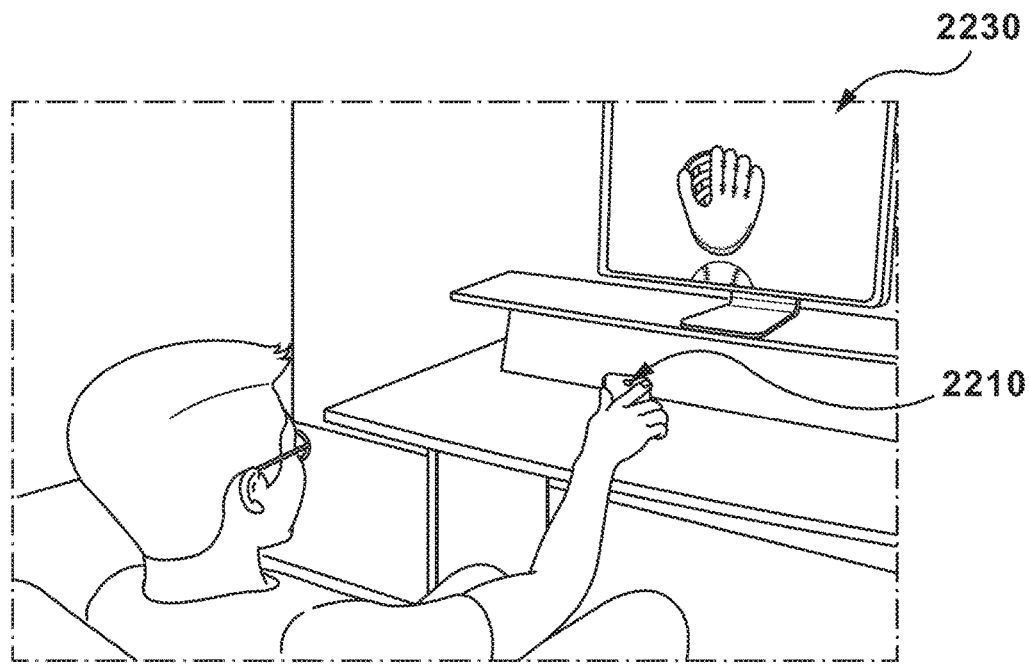
FIG. 23 illustrates a user interacting with the secondary device of FIG. 22, wherein the user is virtually throwing the ball and the ball is no longer displayed on the secondary device but rather the ball is then displayed on the primary viewing device.
Figure 24:
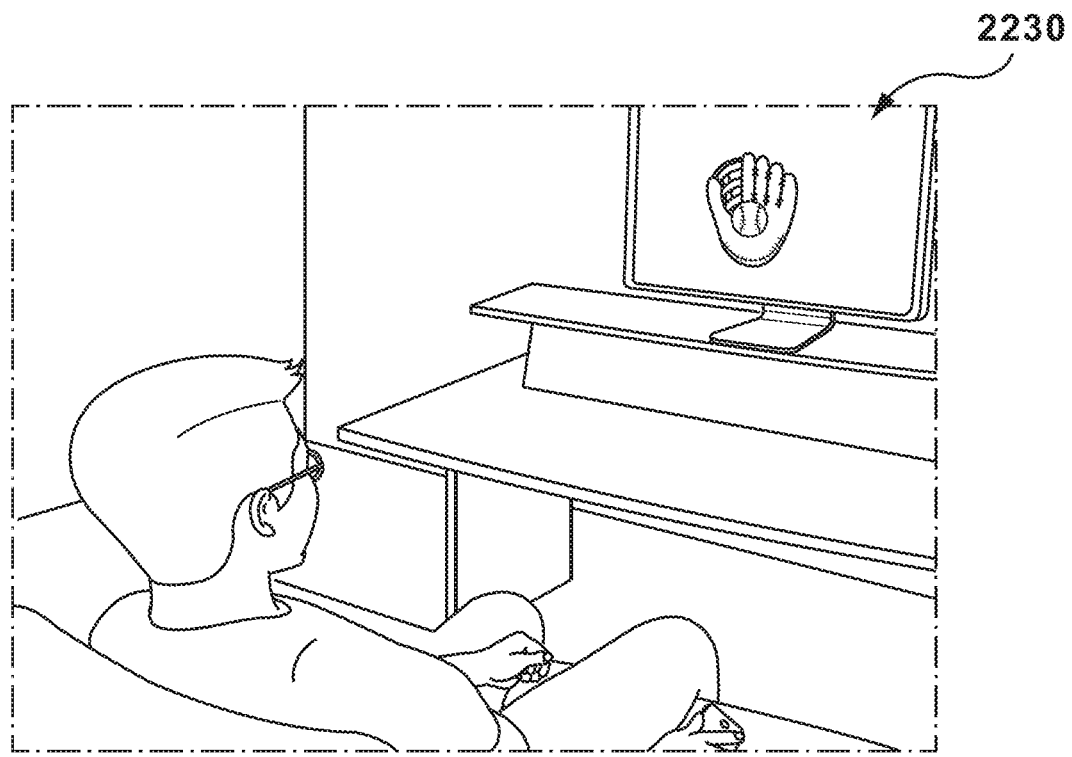
FIG. 24 illustrates the primary viewing device of FIG. 22, wherein the primary viewing device displays the ball being virtually caught by the glove.

Another example of such interactive second screen haptics is shown in FIGS. 22-24. In this embodiment, as shown in FIG. 22, a multi-device system 2200 includes a gaming console (not shown) having software running thereon, a primary viewing device 2230, and a secondary device 2210. The software on the gaming console is a media server and the source of the audio-video content and haptic content, and primary viewing device 2230 is configured to output the audio-video content received from the media server while secondary device 2210 includes a haptic output device and is configured to output the haptic content received from the media server as a haptic effect via the haptic output device. With reference to FIGS. 22-24, a user interacts or controls the content on secondary device 2210. FIG. 22 illustrates a ball displayed on the screen of secondary device 2210 and a glove or target displayed on the screen of primary viewing device 2230. FIG. 23 illustrates the user virtually throwing the ball. The user moves secondary device 2210 in a throwing motion, and the ball is no longer displayed on the secondary device but rather the ball is then displayed on primary viewing device 2230 as shown in FIG. 23. FIG. 24 illustrates the ball being virtually caught by the glove. More particularly, after a predetermined elapsed time, primary viewing device 2230 displays the ball being caught within the glove displayed on the primary viewing device.

Although the interactive second screen haptics examples described above with respect to FIGS. 16-21 and 22-24 include a primary viewing device and a single secondary device, it will be understood by one of ordinary skill in the art that the systems may include multiple secondary devices that each interact with the same primary viewing device. For example, if several users are watching and participating in a video game that is displayed on a singular primary viewing device, each user may each be holding their own secondary device to individually interact with the virtual environment displayed on the primary viewing device. In an embodiment, the primary viewing device and/or media server may do an initial scan or search for any haptically-enabled secondary devices and then the primary viewing device and/or media server delivers at least the haptic signal to each haptically-enabled secondary device that was located in the initial search/scan. As such, any haptically-enabled secondary device found in the initial search/scan may interact with the video game on the primary viewing device.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. For example, although secondary devices described herein may include a display screen and/or a sound device for optionally outputting audio and/or video content, the secondary devices are not required to have these components and functionalities. For example, in addition to haptic output, the secondary device may have video output, may have audio output, may have both video and audio output, or may have neither video nor audio output. Further, although primary viewing devices described above include a display screen and a sound device for outputting the audio and video content, respectively, the primary viewing device may alternatively output only audio content (e.g., music without video content) or may alternatively output only video content (e.g., a silent film without audio content) or may include separate or distinct displays for each of the audio content and video content. In addition, embodiments herein describe that the haptic content output by the secondary device is associated with or related to the video-audio content output by the primary viewing device. However, in another embodiment hereof, the haptic content may have as a purpose to draw the user's attention to the secondary device in order to encourage an interaction on the secondary device, irrespective of the content being displayed on the primary viewing device. For example, the haptic content may have an advertising purpose. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A system comprising:
at least one media server system, wherein the at least one media server system includes a source of audio-video content and haptic content and is configured to stream the audio-video content and the haptic content as streamed audio-video content and streamed haptic content, the streamed haptic content being correlated with the streamed audio-video content to enhance the substance of the audio-video content, wherein the at least one media server system is configured to stream at least the audio-video content directly to a remotely-located primary viewing device and is configured to stream at least the haptic content directly to a remotely-located secondary device,
wherein the primary viewing device includes a first playback locator that determines a temporal reference point representing a temporal playback position in the streamed audio-video content and the secondary device includes a second a playback locator that determines a temporal reference point representing a temporal playback position in the streamed haptic content and wherein the primary device communicates the first playback locator to the secondary device to communicate the temporal playback position in the streamed audio-video content to the secondary device to synchronize playback of the streamed haptic content on the secondary device to playback of the streamed audio-video content on the primary device.

2. The system of claim 1, wherein the at least one media server system includes a single server including the source of both the audio-video content and the haptic content.

3. The system of claim 1, wherein the at least one media server system is configured to stream the audio-video content and the haptic content directly to the secondary device.

4. The system of claim 1, further comprising:
a primary viewing device including a display screen, wherein the primary viewing device is configured to output the streamed audio-video content received from the at least one media server system; and
a secondary device including a haptic output device, the secondary device being configured to receive user input, wherein the secondary device is configured to output the streamed haptic content received from the at least one media server system as a haptic effect via the haptic output device.

5. The system of claim 4, wherein the secondary device includes a display screen configured to output the streamed audio-video content.

6. The system of claim 5, wherein the at least one media server system is configured to stream the audio-video content and the haptic content directly to the secondary device.

7. The system of claim 4, wherein the secondary device is configured to be held or coupled to a user.

8. The system of claim 7, wherein the secondary device is a tablet computer or mobile phone.

9. The system of claim 1, wherein the playback locator of the secondary viewing device is configured to communicate a playback position of the streamed haptic content to the primary device to synchronize playback of the streamed haptic content on the secondary device to playback of the streamed audio-video content on the primary device.

10. A system comprising:
at least one media server system, wherein the at least one media server system includes a source of audio-video content and haptic content and is configured to stream the audio-video content and the haptic content as streamed audio-video content and streamed haptic content, the streamed haptic content being correlated with the streamed audio-video content to enhance the substance of the audio-video content, wherein the at least one media server system is configured to stream at least the audio-video content directly to a remotely-located first viewing device and is configured to stream both the audio-video content and the haptic content directly to a remotely-located second viewing device
wherein the first viewing device includes a first playback locator that determines a temporal reference point representing a temporal playback position in the streamed audio-video content and the second viewing device includes a second a playback locator that determines a temporal reference point representing a temporal playback position in the streamed haptic content and wherein the first viewing device communicates the first playback locator to the second viewing device to communicate the temporal playback position in the streamed audio-video content to the second viewing device to synchronize playback of the streamed haptic content on the second viewing device to playback of the streamed audio-video content on the first viewing device.

11. The system of claim 10, wherein the at least one media server system includes a single server including the source of both the audio-video content and the haptic content.

12. The system of claim 10, further comprising:
a first viewing device including a display screen, wherein the first viewing device is configured to output the streamed audio-video content received from the at least one media server system; and
a second viewing device including a display screen and a haptic output device, the second viewing device being configured to receive user input, wherein the second viewing device is configured to output the streamed haptic content received from the at least one media server system as a haptic effect via the haptic output device and is configured to output the streamed audio-video content.

13. The system of claim 10, wherein the playback locator of the second viewing device is configured to communicate a playback position of the streamed haptic content to the first viewing device to synchronize playback of the streamed haptic content on the second viewing device to playback of the streamed audio-video content on the first viewing device.

14. A method of conveying a haptic effect to a viewer of audio-video content, the method comprising:
streaming, from a media server, at least audio-video content directly to a remotely-located first viewing device as streamed audio-video content; and
streaming, from the media server, at least haptic content correlated with the audio-video content to enhance the substance of the audio-video content directly to a remotely-located second device as streamed haptic content,
communicating, from the first viewing device via a playback locator that determines a temporal reference point representing a temporal playback position in the audio-video content, a playback position in the streamed audio-video content to the second viewing device to compare to the second playback locator that determines a temporal reference point representing a temporal playback position in the streamed haptic content of the second viewing device to synchronize playback of the streamed haptic content on the second viewing device to playback of the streamed audio-video content on the first viewing device.

15. The method of claim 14, wherein streaming at least the audio-video content and streaming at least the haptic content are performed by at least one media server system.

16. The method of claim 14, wherein streaming at least the audio-video content is performed by a first media server and the step of streaming at least the haptic content is performed by a second media server.

17. The method of claim 14, wherein streaming at least the haptic content directly to a second device further includes streaming the audio-video content such that both the haptic content and the audio-video content are transferred directly to the second device.

18. The method of claim 14, further comprising communicating, via a playback locator of the second viewing device, a playback position of the streamed haptic content to the first viewing device to synchronize playback of the streamed haptic content on the second viewing device to playback of the streamed audio-video content on the first viewing device.

* * * * *